United States Patent [19]

Cherry et al.

[11] Patent Number: 4,879,456

[45] Date of Patent: Nov. 7, 1989

[54] METHOD OF DECODING A BINARY SCAN SIGNAL

[75] Inventors: Craig D. Cherry; Andrew P. Taussig, both of Eugene; Michael T. Brooks, Veneta, all of Oreg.

[73] Assignee: Spectra-Physics, Inc., San Jose, Calif.

[21] Appl. No.: 64,110

[22] Filed: Jun. 18, 1987

[51] Int. Cl.$^4$ .............................................. G06K 7/10
[52] U.S. Cl. ...................................... 235/462; 235/463
[58] Field of Search ................. 235/463, 436, 462, 466

[56] References Cited

U.S. PATENT DOCUMENTS

| 4,354,101 | 10/1982 | Hester | 235/463 |
| 4,687,912 | 8/1987 | Ohta | 235/463 |
| 4,782,220 | 11/1988 | Shuren | 235/463 |

*Primary Examiner*—A. D. Pellinen
*Assistant Examiner*—Leon K. Fuller
*Attorney, Agent, or Firm*—Killworth, Gottman, Hagan & Schaeff

[57] ABSTRACT

A method of decoding a binary scan signal consisting of a bit sequence produced by an electro-optical scanning device as the device scans bar code symbols on a label is disclosed. The bits in the sequence correspond to light and dark spaces making up the bar code symbols. The method includes the steps of: a. supplying the binary scan signal to a storage buffer such that the buffer contains a plurality of bits most recently produced by the scanning device, b. selecting a portion of the bit sequence which defines a large light space, c. subjecting the bits in the sequence following those defining the large light space to a series of tests to determine whether such bits were produced by scanning a bar code symbol which is valid in one or more of several bar codes, d. decoding the bar code symbol in the codes in which it is valid, e. subjecting the next bits in the sequence to a series of tests to determine whether such bits were produced by scanning a bar code symbol which is valid in any of the bar codes in which the previously decoded bar code symbol is valid, f. decoding the bar code symbol in the codes in which it and the previously decoded bar code symbol are valid, and g. repeating steps f. and g. above until all bar code symbols on the label have been decoded.

20 Claims, 1 Drawing Sheet

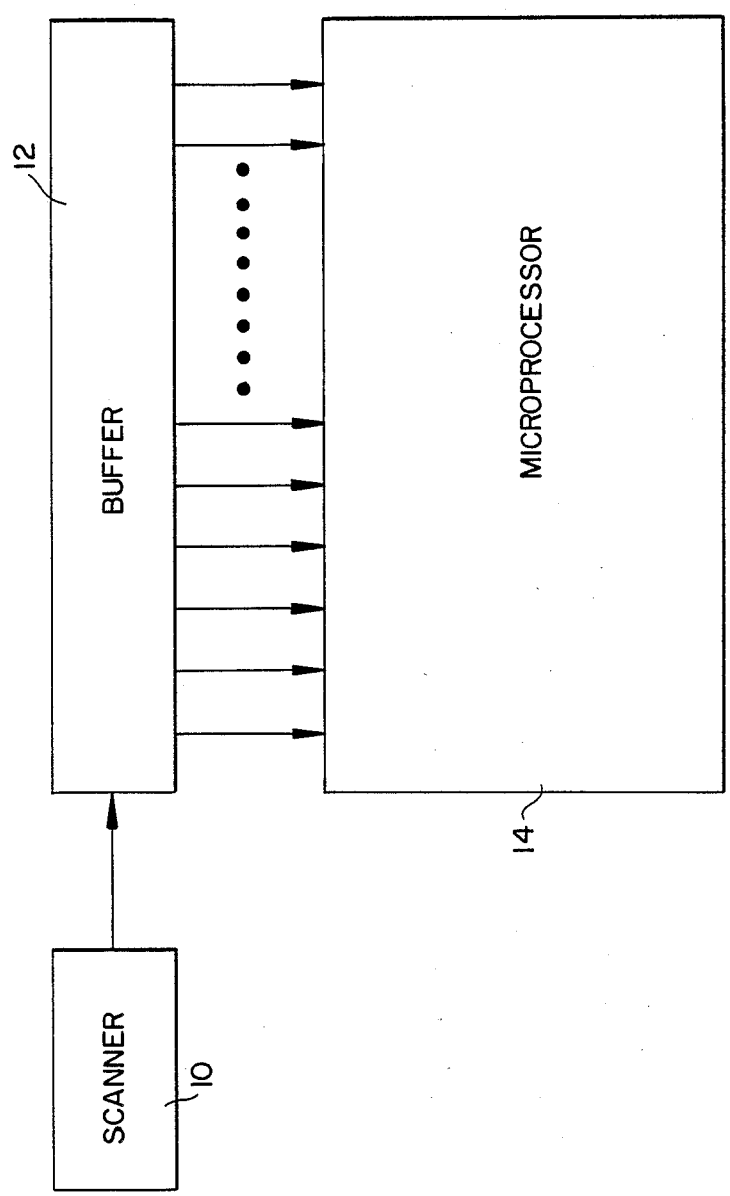

METHOD OF DECODING A BINARY SCAN SIGNAL

BACKGROUND OF THE INVENTION

The present invention relates to bar code scanners and, more particularly, to label scanning systems of the type which are designed to read labels having information which may be presented in any of a number of different codes commonly in use.

Labels bearing information in a number of different bar code formats are typically used in a number of different applications. It is common, for example, to encode product identification information as a series of printed bars or dark areas, and interposed white spaces or light areas, on a product package or on a label affixed to the product package. An electro-optical scanner located at a check-out station in a retail establishment is then used by a clerk to automatically enter the product identification data into a computer terminal. This permits the computer to then determine the total price of the products being purchased, as well as storing the identity of the purchased products for inventory and accounting purposes.

While such an arrangement greatly enhances the efficiency of the check-out process in the retail establishment and additionally allows the accumulation of sales data which is important for proper management controls, difficulties are encountered in the scanning operation due to the nature of the products being scanned and the number of different bar codes currently in use. Packaging for various products is designed to make the products appealing to the consumer and, as a consequence, may include various graphics and test which, when scanned, produce a binary scan signal which mimics that produced when a label having valid bar code symbols is scanned. Additionally, a number of different bar codes have come into popular use, and the scanner circuitry must be capable of recognizing and decoding labels printed in each of these codes.

It is important that the scanner system be capable of accomplishing these tasks automatically, without intervention by the clerk, even if several labels in different bar codes are affixed to a single product. This presents substantial difficulties since the bar codes vary significantly in their formats. As an example, Code 3 of 9 is a binary code using elements of two widths in a symbol to represent a single character. Each of the 44 defined patterns of bars and spaces consists of five bars and four spaces. Each pattern represents one character in the forward direction and has the appearance of a second character in the reverse direction. The Interleaved 2 of 5 code, on the other hand, is a binary code using elements of two widths to represent numeric characters. Each frame or symbol, ten elements in length, contains two characters, the first being represented by the bar pattern, and the second by the space pattern. There is no gap between adjacent characters. In both codes, the proper scan direction, which may be a direction opposite to that in which the symbol was actually scanned by the electro-optical scanner, is determined by start and stop patterns at the beginning and end of the string of characters.

A number of other bar codes have also come into common use, including for example Codabar, Code 93, Code 128, the Universal Code (UPC), and the European Article Numbering (EAN) code. It will be appreciated that there is a need for a method of decoding a label in any of these codes without requiring an operator assessment of the specific code used for the label.

SUMMARY OF THE INVENTION

This need is met by a method according to the present invention for decoding a binary scan signal consisting of a bit sequence produced by an electro-optical scanning device as the device scans bar code symbols on a label, with the bits in the sequence corresponding to light and dark spaces making up the bar code symbols. The method comprises the steps of: a. supplying the binary scan signal to a storage buffer such that the buffer contains a plurality of bits most recently produced by the scanning device; b. selecting a portion of the bit sequence which defines a large light space; c. subjecting the bits in the sequence following those defining the large light space to a series of tests to determine whether such bits were produced by scanning a bar code symbol which is valid in one or more of several bar codes; d. decoding the bar code symbol in the codes in which it is valid; e. subjecting the next bits in the sequence to a series of tests to determine whether such bits were produced by scanning a bar code symbol which is valid in any of the bar codes in which the previously decoded bar code symbol is valid; f. decoding the bar code symbol in the codes in which it and the previously decoded bar code symbol are valid; and g. repeating steps e. and f. above until all bar code symbols on the label have been decoded.

The several bar codes may include one or more codes selected from the group consisting of Code 3 of 9, Interleaved 2 of 5, Codabar, Code 93, Code 128, and UPC/EAN, or others using similar data encoding methods.

One of the series of tests may be the comparison of the element ratio of the bits being tested with present minimum and maximum element ratio levels, the element ratio being the ratio of the width of the widest of the dark spaces making up the symbol to the width of the narrowest of the dark spaces making up the symbol.

One of the series of tests may be the comparison of the element ratio of the bits being tested with preset minimum and maximum element ratio levels, the element ratio being the ratio of the width of the widest of the light spaces making up the symbol to the width of the narrowest of the light spaces making up the symbol.

One of the series of tests may be the comparison of the margin ratio of the bits being tested with a preset minimum margin ratio level, the margin ratio being the ratio of the width of the large light space preceding the symbols on a label to the sum of the width of the first several light and dark spaces making up the first symbol adjacent the large light space.

One of the series of tests may be the comparison of the threshold ratio of the bits being tested with a present with a preset threshold ratio, the threshold ratio being the ratio of the width of the widest light or dark space making up the symbol to the width of a particular light or dark space within the symbol.

One of the series of tests may be the comparison of the character ratio of the bits being tested with preset maximum and minimum character ratio levels, the character ratio being the ratio of the sum of the widths of the light and dark spaces making up a symbol to the sum of the widths of the light and dark spaces making up the previous symbol.

One of the series of tests may be the comparison of the gap ratio of the bits being tested with preset maximum and minimum gap ratio levels, the gap ratio being the sum of the widths of the light and dark spaces making up a symbol to the width of the light space between the symbol and an adjacent symbol.

One of the series of tests may be the comparison of the maximum narrow element ratio of the bits being tested with a preset maximum narrow element ratio level, the maximum narrow element ratio being the greater of the maximum ratio of the width of the narrowest dark space in a symbol to the width of the narrowest light space in the symbol, or the maximum ratio of the width of the narrowest light space in the symbol to the width of the narrowest dark space in the symbol.

Step d. may include the step of checking to determine whether the decoded bar code symbol is a backward or forward start or end symbol prior to subjecting further bits in the sequence to testing and decoding.

Step g. may include the step of checking the decoded bar code symbol to insure that it is decoded as a symbol which is one of a valid set of such symbols prior to repeating steps e. and f.

The method may further comprise the step of comparison of the margin ratio of the bits in the sequence defining the final symbol with a preset minimum margin ratio level, the margin ratio being the ratio of the width of a large light space following the symbols on a label to the sum of the width of the last several light and dark spaces making up the last symbol adjacent the large light space.

At least some of the tests to determine whether the bits in the bit sequence were produced by scanning a bar code symbol which is valid in several codes may be performed simultaneously. Alternatively, the tests to determine whether the bits in the bit sequence were produced by scanning a bar code symbol which is valid in several codes may be performed sequentially.

Steps a. through g. may be performed by a programmed digital computer.

Accordingly, it is an object of the present invention to provide a method of decoding a binary scan signal consisting of a bit sequence produced by an electo-optical scanning device as the device scans bar code symbols; to provide such a method in which the bar code symbols are automatically decoded regardless of which of several different codes are scanned; and to provide such a method in which the bar code symbols are not decoded in an erroneous bar code.

BRIEF DESCRIPTION OF THE DRAWING

The FIGURE is a schematic representation of a scanner, storage buffer, and microprocessor which may be utilized to perform the method of the present invention.

DETAILED DESCRIPTION OF THE PREFERRED EMBODIMENT

The present invention relates to a method for decoding a binary scan signal consisting of a bit sequence produced by an electro-optical scanning device as the device scans bar code symbols on a label. The bits in the sequence correspond to the widths of the light and dark spaces defined by the spaces between the bars and by the bars themselves, respectively. Detailed algorithms for decoding the referenced bar codes, given measurements of the bars and spaces in a label, are provided below. The preferred apparatus by which this method is implemented is a programmed microprocessor. A hardware based decoder system may, however, use the same label acceptance criteria, with suitable use of parallelism and some adjustment of the numeric ratios and limits for ease of computation.

The goal in developing the algorithms utilized in the present invention was low error rate, fast response, and compatibility with autodiscrimination of the various bar codes. Low error rate requires that all available information in the measurments be used in deciding if a good label is present. The measurements and methods used eliminate the effects of systematic errors in the printing and scanning process. Fast response while autodiscriminating several codes requires efficient implementation and early recognition of being in the wrong code. Various data capture methods may be supported, such as capture of a scan before decoding, or concurrent data capture and decoding.

The algorithms operate according to the following specific guidelines:

A. All bars and spaces in the label are checked for validity in some way.
B. Label margins are required.
C. Labels may be read forward or backward.
D. Tests for label validity are done sequentially, starting with the fastest screen for a good label, progressing to the tests which generally reject fewer labels, or take longer to compute. Details of these tests are given in the sections for each code in this document. Failure of any test during this process results in trying a different decoder algorithm, or looking for a label at a different point in the scan data.
E. After a label appears valid based on its structure and analysis of its element widths, additional operations may be performed, such as checksum validation and postprocessing into the final data to be sent from the decoder. Efficiency of the scanning and decoding process depends on the control structures used to look for labels and call the software decoders.

Referring to the FIGURE, the algorithms disclosed herein assume that a binary scan signal, consisting of a bit sequence produced by an electro-optical scanning device 10, is available in a buffer 12. This bit sequence is produced by the scanning device 10 as it scans a package bearing a bar code label. Buffer 12 contains a complete scan pattern or a moving window of the scan data. Potential locations for the start of a symbol on the label are identified by checking for large white spaces defined by the data, which may correspond to the label margin. (It should be understood that throughout this discussion, "white space" and "light space" may be used interchangeably, since some bar code patterns may not be printed on truly white background surfaces. Similarly, the "bars" may also be referred to as "dark spaces.") Decoder algorithms, performed by microprocessor 14, preferably a Thompson-Mostek MK68HC200 microprocessor, are then accessed to attempt decoding in the particular codes at the buffer location specified. It will be appreciated that other microprocessors may also be utilized, if desired.

Each decoder algorithm specified will try to decode a label at the location specified. If a good label is not found, other decoder algorithms may then be used for the same data until all have been tried. If none are successful, the buffer may then be searched for another possible label. The buffer may be filled during one sweep of the scan pattern, then decoded, or data may be added to the buffer continuously and decoded concurrently. While the various algorithms are accessed sequentially in the preferred embodiment, it will be appreciated that the selected algorithms may be accessed simultaneously. The tests by which valid bar code symbols may be recognized for the various codes may be performed prior to decoding. Alternatively, a portion of the tests may be performed, preferably the tests which may be performed quickly, and then the symbols decoded. The balance of the tests may then be performed. A complete hardware implementation of the present invention would utilize similar decisions in the actual decoding process. The algorithms by which the method of the present invention are effected are given in the following sections, delineated Sections 4 through 9.

Section 4: Code 3 of 9

4.1 General Description of Code 3 of 9

See the referenced document for details. This is a binary code using elements of two widths to represent alphanumeric and some special characters. Each character pattern contains three wide elements and mix narrow elements. The ratio of the wide elements to narrow elements may vary over the range of 2:1 to 3:1 from one label to another, but is to be constant within a given label. There is a gap between adjacent characters. Each of the 44 defined bar/space patterns consists of 5 bars and 4 spaces. Each pattern represents one character in the forward direction and looks like another character in the reverse direction. The actual scan direction is determined by looking for one of two possible valid characters at the beginning of the label; the usual start/stop character, or a reversed version of the start/stop character. In order to reduce errors due to systematic distortion of bar and space size, the decoding process for each character treats the bars and spaces separately. The number of data characters in a label is variable. A maximum length of 32 data characters is commonly specified. Optional features including label concatenation, a check character, and 128 character ASCII character set are defined in the AIM spec.

4.2 Overview of the algorithm

Variables and constants used in the decoding process are defined below, followed by a brief description of the decoding algorithm. A detailed description of the algorithm follows in section 4.3.

4.2.1 Status Variables

Values of the status variables can be maintained globally to allow re-entrant use of the decoder.

| Variable name | Description |
|---|---|
| i | pointer to the current element in the data buffer. This always points to a space when the decoder is called. |
| last char width | sum of the element widths in the last character decoded in the current label. This doesn't include the intercharacter gap. |
| current character | decoded ASCII character |
| label string | decoded characters as an ASCII string. |
| forward | boolean; true if decoding in forward direction. |
| continue decode | boolean; true while the buffer at the current element looks like good data. |
| found label | boolean; true when a label has been put into label string. |
| data buffer | array of numbers representing widths of the elements scanned. They must alternate between bars and spaces. |

4.2.2 Decode Constants

Constant values are identified in this section. The constants are referenced by name in the description of the algorithm

| Constant name | Value | Description |
|---|---|---|
| frame width | 10 | Number of elements in a character plus the gap. |
| threshold ratio | .70 | Ratio of the width of the widest bar (space) in a character to the wide/narrow decision point. |
| min element ratio | 1.5 | lower limit on the ratio of the width of the widest bar (space) to the narrowest bar (space) in a character. |
| max element ratio | 5.0 | upper limit on the ratio of the width of the widest bar (space) to the narrowest bar (space) in a character. |
| max narrow element ratio | 3.0 | max ratio of the narrowest bar in a character to the narrowest space, or vice versa. |
| max char ratio | 1.25 | max ratio of the sum of the elements in the current character to last char width, not including the intercharacter gap. |
| min char ratio | .80 | min ratio of the sum of the elements in the current character to last char width, not including the intercharacter gap. |
| max gap ratio | 30 | max ratio of the sum of the elements in the current character to the previous intercharacter gap. |
| min gap ratio | 2.0 | min ratio of the sum of the elements in the current character to the previous intercharacter gap. |
| min margin ratio | 1.0 | min ratio of the width of the white space before the label to the sum of the width of the first four elements of the label. |

4.2.3 Derivation of constants

| | |
|---|---|
| threshold ratio | This is chosen to be near the midpoint of the difference between a narrow element and a wide element. For an N:1 wide/narrow ratio the value giving the midpoint is $t = (((N - 1)/2) + 1)/N$. For $N = 3$ $t = .6666$; $N = 2.5$ $t = .7000$; $N = 2$ $t = .7500$. We are using .7000. If an application only used a fixed ratio other than 2.5:1 this could be optimized to match. If using a simple integer ratio is helpful $t = 23/32$ corresponds to $N = 2.3$. If labels are rejected due to a wide variation in the width of the narrow elements in the four characters $/+%$ (because of the test for all narrow elements) the ratio could be decreased. |
| min element ratio | This is set to one half of the 2:1 minimum spec value for the wide/narrow ratio. Again, it and other limits could be changed for a particular application. |

| | |
|---|---|
| max element ratio | This is set to 5.0 based on the ratio of the widest wide element to the narrowest narrow element when the spec tolerances are applied to a nominal label. The actual worst case ratio is (3 * .040 + .014)/(.040 − .014) = 5.15. |
| max narrow element ratio | This is the only comparison other than total character width limiting the size of bars versus spaces. This is based on the spec ratio of a narrow element plus the tolerance to a narrow element minus the tolerance, plus some more to allow for scanning errors and printing errors beyond spec. The limit per spec is: (.040 + .014)/(.040 − .014) = 2.08. Use 3.0. There is no theoretical upper limit to this, but it shouldn't be set to a value larger than will be seen in a label that is otherwise intact enough to decode. |
| max char ratio, min char ratio | These are chosen based on the possible scanning spot velocity variation within a character and the scanning and printing error over the character elements. Use 1.25 and .80 until better data for the particular scanning device being used is available. |
| max gap ratio | This is based on the ratio of the sum of the width of the elements in the widest legal character (excluding the gap) to the narrowest gap. In a label with a 3:1 wide/narrow ratio a character is 15 nominal elements wide. At .040 inch nominal element size the minimum gap is .040−.014 or .65 nominal. This gives a ratio of 15/.65 = 23. Use 30 to allow for out of spec gap widths. |
| min gap ratio | This is based on the ratio of the sum the width of the elements the narrowest legal character (excluding the gap) to the widest gap. In a label with a 2:1 wide/narrow ratio a character is 12 nominal elements wide. The widest gap is 5.3 times a nominal element per spec, for a ratio of 12/5.3 = 2.26. Use 2 to allow some extra margin for error. |
| min margin ratio | This is a compromise between enforcing the rigorous spec limits and program efficiency. The minimum white space per spec is 10 times the nominal element size. The sum of the first four elements of the label for a 2:1 label is 5 times nominal; for a 3:1 label it is 6 times nominal. This results in a min margin of 5 to 6 elements, which allows for out of spec labels and scanning error. |

4.2.3 General Decoding method

For efficiency the data buffer should be searched for a large white space indicating a potential label margin. Then all decoders can start processing from this point, avoiding duplicating the search process. If the decoder doesn't find a good label starting at this position it will exit back to the calling program. Before the decoder is first called some of the status variables must be initialized. They should be set as follows:

| | |
|---|---|
| i | set to point to large white space. |

Before any operation that looks at the data buffer, it is assumed that proper care will be taken to make sure that data is available in the buffer.

Each time the decoder is called it makes the comparison specified by min margin ratio. If this test passes, it looks for a forward or backward start character pattern and tests the elements in the character using threshold ratio, min element ratio, max element ratio, and max narrow element ratio. If this is all ok, the following variables are met:

| | |
|---|---|
| continue decode | true |
| forward | true or false, depending on the character found |
| last char width | set to the sum of the elements in the start character |
| label string | set to empty |
| i | set to the current value of i + frame width. |

Then it continues going through the label elements, appending characters to the label string until an error occurs, or the end character is found. For each character, the same checks made for a start character are applied (except the min margin ratio) plus the intercharacter checks for max char ratio, min char ratio, max gap ratio and min gap ratio. If the character found wasn't a stop character and all tests passed, the status variables are updated:

| | |
|---|---|
| last char width | set to the sum of the elements in the character just found |
| label string | the character found is appended to label string |
| i | set to the current value of i plus frame width |

If any test fails, continue decode is set false.

If the character was a stop character, set continue decode false, and check for the trailing margin using min margin ratio. If ok, do any secondary processing such as reversing the label string to correct for a backward scan, evaluating an optional check character, expansion to full ASCII, label concatenation, etc. Then if everything is ok set found label true.

The check for a good character pattern is done by finding the widest bar and space in the character, multiplying each by the threshold ratio, then comparing the result to each bar and space in the character to identify the wide and narrow elements. Note that this treats bars and spaces independently. The result is recorded as two binary patterns, one for bars and one for spaces, with ones indicating wide elements. Since it is possible for a Code 3 of 9 character pattern to have no wide bars (which would look like all wide bars to the above procedure), a separate test must be performed to detect this and correct the binary pattern. The two binary numbers are used to find table entries indicating if a good character was read and its value. If a good character pattern was found, the smallest bar and space, and the total character width are determined. Tests for min and max element ratios are done independently for bars and spaces, taking into account the case of all narrow bars. The max narrow element ratio test limits the difference between the width of bars and spaces. If all these tests are ok, a good character was found.

4.3 Code 3 of 9 Decode Algorithm

The decoding algorithm is given below. If any label integrity test fails, an exit from the algorithm will occur with the status variable found label set to false. Before calling the decoder set i to point to a possible margin (wide white space). Information in the scan data buffer is referred to as element(i) for the ith element of the data buffer. During the decoding process i is assumed to point to a margin or intercharacter gap. Follow the steps as specified, starting at 4.3.1.

4.3.1 Set found label false.

4.3.2 If less then frame width counts are available to be examined wait. (Check i+frame width against the last buffer location.)

4.3.3 If (element(i)<min margin ratio *(the sum of element(i+1) through element(i+4)) quit (margin too small).

4.3.4 Do the steps 4.3.11, 4.3.12, and 4.3.13 to look for a start pattern. If the bar pattern found is 00110 and the space pattern found is 1000 set forward true, or if the bar pattern is 01100 and the space pattern is 0001 set forward false. If neither combination was found quit (no start char found). Otherwise do the procedure specified starting at step 4.3.17 to check the element widths in the character. If they don't pass the tests, quit (character elements out of limits). Otherwise set continue decode true, set last char width to the sum of the elements in the character computed at step 4.3.17, set label string to empty, and increment i by frame width. An apparent label start has been found.

4.3.5 If less then frame width counts are available to be examined wait. (Check i+frame width against the last buffer location.)

4.3.6 Do the procedure specified starting at step 4.3.11 to get the character pattern. If a legal pattern wasn't found set continue decode false and quit (no char found). Otherwise do the procedure starting at step 4.3.17 to check the element widths in the character. If they don't pass the tests, set continue decode false and quit (character elements out of limits).

4.3.7 Compute the ratio of the sum of the elements in the current character to last char width. If this ratio is greater than max char ratio or less than min char ratio set continue decode false and quit.

4.3.8 Compute the ratio of the sum of the elements in the current character to element(i). If this ratio is greater than max gap ratio or less than min gap ratio set continue decode false and quit.

4.3.9 If the current character found in step 4.3.6 is '*' go to step 4.3.10. Otherwise if the length of label string is the maximum allowable label length set continue decode false and quit (label string overflow). Otherwise set last char width to the width of the current character, add frame width to i, and append the current character to label string. Go to step 4.3.5.

4.3.10 Set continue decode false. If element(i+framewidth)<min margin ratio * (the sum of element(i+6) through element(i+9)) then quit. Otherwise if forward is false reverse label string, and do any optional operations for check sum, full ASCII character set, or concatenation (per the referenced spec). If no errors are found set found label true and quit.

4.3.11 This section is referenced from the main flow of the algorithm and you should return to the step which called this one when done here. Only the first three steps (11-13) will be done when looking for a start character. The elements of the current character will be examined looking for a good character pattern. Find the widest bar and widest space in the nine elements i+1 through i+9. Multiply each of these by threshold ratio to find the wide/narrow breakpoint.

4.3.12 Set a binary number which will represent the bar pattern to 0. Now for each of the elements i+1, i+3, i+5, i+7, and i+9, multiply bar pattern by 2, then increment it by 1 if the element under consideration is greater than the bar threshold calculated in step 4.3.11. When done if bar pattern equals 11111 binary then set bar pattern to 0 (no real character has all wide bars, but some have all narrow, which requires this adjustment).

4.3.13 Set a binary number which will represent the space pattern to 0. Now for each of the elements 1+2, i+4, i+6, and i+8, multiply space pattern by 2, then increment it by 1 if the element under consideration is greater than the space threshold calculated in step 4.3.11.

4.3.14 If bar pattern isn't 0 go to 4.3.15. Otherwise set char pointer according to the value of space pattern:

| space pattern: | char pointer: |
|---|---|
| 7 | 44 |
| 11 | 43 |
| 13 | 42 |
| 14 | 41. |

If space pattern isn't one of these four values return; the test failed. Otherwise go to 4.3.16.

4.3.15 Use the two look up tables
space index [0 ... 15]=0, 3, 2, 0, 1, 0, 0, 0, 4, 0, 0, 0, 0, 0, 0, 0
bar index [0 ... 31]=0, 0, 0, 7, 0, 4, 10, 0, 0, 2, 9, 0, 6, 0, 0, 0, 1, 8, 0, 5, 0, 0, 0, 3, 0, 0, 0, 0, 0, 0, 0, 0
to determine what character is represented by the bars and spaces. If bar index [bar pattern]=0 or space index [space pattern]=0 then return; the test failed. Otherwise set char pointer to
10*(space index [space pattern]−1) +bar index [bar pattern].
This process takes advantage of the repetitive bar and space patterns used in the Code 3 of 9 characters.

4.3.16 Use char pointer to select a forward character or backward character from these two lists of 44 characters. For example, if char pointer is two and forward is false, pick the second character from the backward list, and so on. If forward is true, set current character to the correct character in the forward character list, otherwise use the backward character list.

Forward characters:
1234567890ABCDEFGHIJKLMNOPQRSTUVWXYZ-. *$/+%

Backward characters:
AHGEDJCBIF1875403296U. -YX*WVZRQONTMLSP%+/$

Return to the step in the main algorithm.

4.3.17 This section is referenced from the main flow of the algorithm and you should return to the step which called this one when done here. This section checks the sizes of elements within a character for correct width ratios. It uses the values of widest space and bar and bar pattern which were found previously. Now find the narrowest bar and space, and the sum of the nine elements following i (which make up the current character).

4.3.18 If the ratio of widest space to narrowest space is greater than max element ratio or less than min element ratio then return; the test failed.

4.3.19 If the ratio of widest bar to narrowest bar is greater than max element ratio then return; the test failed.

4.3.20 If bar pattern is greater than 0 and the ratio of widest bar to narrowest bar is less than min element ratio then return; the test failed.

4.3.21 If the ratio of narrowest bar to narrowest space is greater than max narrow element ratio then return; the test failed.

4.3.22 If the ratio of narrowest space to narrowest bar is greater than max narrow element ratio then return; the test failed.

4.3.23 Ok, return.

Section 5: Interleaved 2 of 5

5.1 General Description of Interleaved 2 of 5

See the referenced document for details. This is a binary code using elements of two widths to represent numeric characters. Each frame (10 elements) contains 2 characters, the first being represented by the bar pattern, the second by the space pattern. Each character pattern contains two wide elements and three narrow elements. The ratio of wide elements to narrow elements may vary over the range of 2:1 to 3:1 from one label to another, but is to be constant within a given label. There is no gap between adjacent characters. The actual scan direction is determined by the difference in the start and stop patterns at the beginning and ending of the label. The decoding process for each character treats the bars and spaces (and therefore each character) separately, in order to reduce errors due to systematic distortion of bar and space size. The number of data characters in a label is variable, but since characters are encoded in pairs, the number must be even. A fixed length is commonly used when decoding Interleaved 2 of 5, because of the relatively high probability that a partial scan of the label will yield seemingly valid data.

5.2 Overview of the algorithm

Variables and constants used in the decoding process are defined below, followed by a brief description of the decoding algorithm. A detailed description of the algorithm follows in the next section.

5.2.1 Status variables

Values of the status variables can be maintained globally to allow re-entrant use of the decoder.

| Variable name | Description |
| --- | --- |
| i | pointer to the current element in the data buffer. This always points to a space when the decoder is called. |
| last char width | sum of the element widths in the last character pair decoded in the current label. |
| label string | decoded characters as an ASCII string. |
| forward | boolean; true if decoding in forward direction. |
| continue decode | boolean; true while the buffer at the current elements looks like good data. |
| found label | boolean; true when a label has been put into label string. |
| data buffer | array of numbers representing widths of the elements scanned. They must alternate between bars and spaces. |

5.2.2 Decode constants

Constant values are identified in this section. The constants are referenced by name in the description of the algorithm

| Constant name | Value | Description |
| --- | --- | --- |
| frame width | 10 | Number of elements in a character pair. |
| threshold ratio | .2188 | Ratio of the wide/narrow decision point to the total width of the bars (spaces) in the character pair. |
| start stop threshold | 1.5 | Ratio of the second bar to the first bar of a start or stop pattern for determination of scan direction. |
| min element ratio | 1.5 | lower limit on the ratio of the width of the widest bar (space) to the narrowest bar (space) in a character. |
| max element ratio | 5.0 | upper limit on the ratio of the the widest bar (space) to the narrowest bar (space) in a character pair. |
| max narrow element ratio | 3.0 | max ratio of the narrowest bar in a ratio character to the narrowest space, or vice versa. |
| max char ratio | 1.25 | max ratio of the sum of the elements in the current character pair to last char width. |
| min char ratio | .80 | min ratio of the sum of the elements in the current character pair to last char width. |
| margin scaler | 8 | Value used to multiply starting bar and space elements in label by to make its width comparable to the width of the first (last) character pair. |
| max margin char | 2 | max ratio of the sum of elements in the |

-continued

| Constant name | Value | Description |
| --- | --- | --- |
| ratio | | current character pair to the width of the start (stop) pattern scaled by margin scaler. |
| min margin ratio | 3.0 | min ratio of the width of the white space before the label to the sum of the width of the first two elements of the label. |

5.2.3 Derivation of constants

| | |
| --- | --- |
| threshold ratio | This is chosen to be near the midpoint of the difference between the ratio of a narrow element and a wide element to the total like element width in the character pair. For an N:1 wide/narrow ratio the value giving the midpoint is $t = ((N + 1)/2)/(3 + 2 * N)$. For $N = 3$ $t = .2222$; $N = 2.5$ $t = .2188$; $N = 2$ $t = .2143$. We are using .2188 (7/32). If an application only used a fixed ratio other than 2.5:1 this could be optimized to match. |
| start stop threshold | This threshold determines whether the pattern being examined is a start or stop pattern. A start pattern has two narrow bars, while a stop pattern has 1 narrow bar and 1 wide bar. This threshold is midway between the nominal narrow width (1) and the minimum wide/narrow ratio (2). |
| min element ratio | This is set to one half of the 2:1 minimum spec value for the wide/narrow ratio. Again, it and other limits could be changed for a particular application. |
| max element ratio | This is set to 5.0 based on the ratio of the widest wide element to the narrowest narrow element when the spec tolerances are applied to a nominal label. The actual worst case ratio is $(3 * .040 + .0165)/(.040 - .0165) = 5.8$. |
| max narrow element ratio | This is the only comparison other than total character width limiting the size of bars versus spaces. This is based on the spec ratio of a narrow element plus the tolerance to a narrow element minus the tolerance, plus some more to allow for scanning errors and printing errors beyond spec. The limit per spec is: $(.040 + .0165)/(.040 - .0165) = 2.40$. Use 3.0. There is no theoretical upper limit to this, but it shouldn't be set to a value larger than will be seen in a label that is otherwise intact enough to decode. |
| max char ratio, min char ratio | These are chosen based on the possible scanning spot velocity variation within a character pair and the scanning and printing error over the character elements. Use 1.25 and .80 until better data for the particular scanning device being used is available. |
| min margin ratio | This is a compromise between enforcing the rigorous spec limits and program efficiency. The minimum white space per spec is 10 times the nominal element size. The sum of the first two elements of the label is always 2X. The largest element in the label can be 3X. Midpoint between 10 and 3 is 6.5X. The threshold ratio used is 3.0 giving a minimum margin of 6X. |

5.2.4 General Decoding method

For efficiency the data buffer should be searched for a large white space indicating a potential label margin. Then all decoders can start processing from this point, avoiding duplicating the search process. If the decoder doesn't find a good label starting at this position it will exit back to the calling program. Before the decoder is first called some of the status variables must be initialized. They should be set as follows:

| | |
| --- | --- |
| i | set to point to large white space. |

Before any operation that looks at the data buffer, it is assumed that proper care will be taken to make sure that data is available in the buffer.

Each time the decoder is called it makes the comparison specified by min margin ratio. If this test passes, it looks for a forward or backward start pattern and tests the elements in the pattern using max narrow element ratio, min element ratio, and max element ratio. If this is all ok, the following variables are set:

| | |
| --- | --- |
| continue decode | true |
| forward | true or false, depending on the pattern found |
| last char width | set to the sum of the elements in the start pattern * margin scaler |
| label string | set to empty |
| i | set to the current value of i + 4 (if forward is true, this points to the element before the first character pair in label. If forward is false, this points to last element of last character pair in label). |

Then it continues going through the label elements, appending characters to the label string until an error occurs, the end pattern is found, or no data is available. For each character, tests using threshold ratio, min element ratio, max element ratio, and max narrow element ratio are applied plus the intercharacter checks for max char ratio, and win char ratio. If the pair is the first found, use the looser max margin char ratio as the intercharacter check. If all tests passed, the status variables are updated:

| last char width | set to the sum of the elements in the character pair just found |
|---|---|
| label string | the character pair found is appended to label string |
| i | set to the current value of i plus frame width |

If any test fails, continue decode is set false.

If a character test failed, check to see if a stop pattern (or reverse start) pattern found, and valid trailing margin using min margin ratio, max element ratio, min element ratio, max like element ratio, max narrow element ratio, and max margin char ratio. If ok, do any secondary processing such as evaluating an optional check character. Then if everything is ok set found label true.

A check for a good character pattern is done by summing the widths of all the bars (spaces) in the character pair, multiplying the result by the threshold ratio, and using this value as the decision point for each bar (space) in the character pair. Note that this treats bars and spaces independently. The result is recorded as two binary patterns, one for bars and one for spaces, with ones indicating wide elements. The two binary numbers are used to find table entries indicating if a good character was read for each and what the character was. If a good character pattern for both characters in the pair was found, the smallest bar and space, and the total character width are determined. Tests for min and max element ratios are done independetly for bars and spaces. The max narrow element ratio test limits the difference between the width of bars and spaces. If all these tests are ok, a good character pair was found.

5.3 Interleaved 2 of 5 Decode Algorithm

The decoding algorithm is given below. If any label integrity test fails, an exit from the algorithm will occur with the status variable continue decode set to false. Before calling the decoder set i to point to a possible margin (wide white space). Information in the scan data buffer is refered to as element (i) for the ith element of the data buffer. During the decoding process i is assumed to point to a margin, the space before the next character pair (forward decode), or the last space of the current character pair (backward decode). Follow the steps as specified, starting at 5.3.1.

5.3.1 Set found label false.

5.3.2 If less than frame width counts are available to be examined wait. (Check i + frame width against the last buffer location.)

5.3.3 If element(i) < min margin ratio *(element(i+1)+element(i+2)), then quit (margin too small).

5.3.4 Look for a valid start pattern: Check if element(i+1)/element(i+2)> max narrow element ratio or element(i+2)/element(i+1)> max narrow element ratio. If so, quit. If not, determine direction of scan: Check if element(i+3)/element(i+1)> start stop threshold. If so, set forward to false, else set forward to true (start pattern has two narrow bars, backward stop pattern has narrow bar followed by wide bar). If forward then check if element(i+2)/element(i+4)> min element ratio or element(i+4)/element(i+2)> min element ratio. If so, quit (two spaces in start pattern are not equal width). If forward also check if element(i+1)/element(i+3)> min element ratio. If so, quit (two bars are not the same width). If forward is false, then check if element(i+3)/element(i+B 1)> max element ratio. If not quit. Otherwise set continue decode true, set last char width to the sum of the elements i+1 and i+2 * margin scaler, set label string to empty, and increment i by 4. An apparent label start has been found.

5.3.5 If less than frame width counts are available to be examined (Check i+ frame width against the last buffer location) wait.

5.3.6 Do the procedure specified starting at step 5.3.11 to get the character pattern. If a legal pattern wasn't found go to step 5.3.9 (no char found, check for start/stop pattern). Otherwise do the procedure starting at step 5.3.15 to check the element widths in the character. If they don't pass the tests, go to step 5.3.9 (character elements out of limits, check for start/stop pattern).

5.3.7 Compute the ratio of the sum of the elements in the current frame to last char width. If this is the first character pair (label string is empty) then check if this ratio> max margin char ratio or (1/this ratio)> max margin char ratio. If it is, then quit (no characters found). If not first time thru, then if this ratio is greater than max char ratio or less than min char ratio go to step 5.3.9.

5.3.8 If the length of label string is the maximum allowable label length set continue decode false and quit (label string overflow). Otherwise set last char width to the wdith of the current frame, add frame width to i, and append the decoded character pair to label string. (If forward is true, then append bar character + space character to end of label string. If forward is false, append space character + bar character to the end of the label string.) Go to step 5.3.5.

5.3.9 Set continue decode to false.

5.3.10 Check for possible end of label: If less than 4 counts available in the buffer then wait. (check i+4 less than or equal to last buffer location). Otherwise, check if element(i+4)/element(i+2)+element(i+-3))> min margin ratio. If not, quit. If so then check if element(i+3)/element(i+2)> max narrow element ratio or element(i+2)/element(i+3)> max narrow element ratio. If so, quit. If not then check that (element(i+2)+ element(i+3)) * margin scaler/last char width is greater than max margin char ratio or less than 1/max margin char ratio. If so, then quit. If not then if forward is true, then check that element(i+1-)/element(i+3) is greater than max element ratio of less than min element ratio. If so, then quit. If forward is false then check that element(i+1)/element(i+3) is greater than start stop ratio or less than 1/min element ratio. If so, then quit. Also, if forward is false, check that element(i)/element(i+2) is greater than win element ratio or less than 1/min element ratio. If so then quit. Otherwise, if forward is false, then reverse order of label string. Then, do any optional operation for check sum. If no errors are found set found label true and quit.

5.3.11 This section is referenced from the main flow of the algorithm and should return to the step which called this one when done. If forward is true, elements i+1 to i+frame width will be summed (bars and spaces separately). If forward is false, then elements i to i+frame width-1 will be summed (bars and spaces separately). Find the widest bar, widest space, narrowest bar, and narrowest space in the corresponding 10 elements just examined. Multiply each of the sums (bar and space) by threshold ratio to find the wide/narrow breakpoint.

5.3.12 Set a binary number which will represent the bar pattern to 0. If forward is true, then use elements in order i+1, i+3, i+5, i+7, i+9. If forward is false, then use elements in order i+9, i+7, i+5, i+3, i+1. For each of the elements, multiply bar pattern by 2, and increment it by 1 if the element under consideration is greater than the bar threshold calculated in step 5.3.11.

5.3.13 Set a binary number which will represent the space pattern to 0. If forward is true, then use elements in order i+2, i+4 i+6, i+8, i+10. If forward is false, then use elements in order i+8, i+6, i+4, i+2, i. For each of the elements, multiply space pattern by 2, and increment it by 1 if the element under consideration is greater than the space threshold calculated in step 5.3.11.

5.3.14 Use the binary number generated by the bar pattern to as a pointer to select a character from the following list, indexed at 0. For example, if the pattern had a value of 2, select the third element in the list. Repeat the above to select the space character using the space pattern.

Character list:
  XXX7X40XX29X6XXXX18X5XXX3XXXXXXX

If the character selected for either bar or space pattern is X then indicate bad pattern to main algorithm, otherwise indicate good pattern. Return to the step in the main algorithm.

5.3.15 This section is referenced from the main flow of the algorithm and should return to the step which called this one when done. This section checks the sizes of elements within a character for correct width ratios. It uses the values of widest and narrowest space and bar and bar pattern which were found previously. Add bar pattern width to space pattern width to get total char width.

5.3.16 If the ratio of widest space to narrowest space is greater than max element ratio or less than min element ratio then return; the test failed.

5.3.17 If the ratio of widest bar to narrowest bar is greater than max element ratio then return; the test failed.

5.3.18 If the ratio of widest bar to narrowest bar is less than min element ratio then return; the test failed.

5.3.19 If the ratio of narrowest bar to narrowest space is greater than max narrow element ratio then return; the test failed.

5.3.20 If the ratio of narrowest space to narrowest bar is greater than max narrow element ratio then return; the test failed.

5.3.21 Ok, return.

Section 6: Codabar

6.1 General Description of Codabar

See the referenced document for details. This is a binary code using elements of two widths to represent the ten digits and the six characters -$:/.+ plus four start/stop characters denoted A,B,C,D. The 20 character patterns each contain 7 elements. The wide/narrow ratio may range from 2:1 to 3:1 from label to label, but is to be constant in a given label. Twelve of the characters contain 2 wide elements while the other 8 contain 3 wide elements. This results is two possible nominal character widths. Characters are separated by an intercharacter gap. A variable number of characters are allowed, but 32 is a common upper limit. The start/stop characters are considered part of the label information, and in some implementations control concatenation. An optional check character is also defined.

6.2 Overview of the algorithm

Variables and constants used in the decoding process are defined below, followed by a brief description of the decoding algorithm. A detailed description of the algorithm follows in the next section.

6.2.1 Status variables

Values of the status variables can be maintained globally to allow re-entrant use of the decoder.

| Variable name | Description |
| --- | --- |
| i | pointer to the current element in the data buffer. This always points to a space when the decoder is called. |
| last char width | sum of the element widths in the last character decoded in the current label. This doesn't include the intercharacter gap. |
| label string | decoded characters as an ASCII string. |
| forward | boolean; true if decoding in forward direction. |
| continue decode | boolean; true while the buffer at the current element looks like good data. |
| found label | boolean; true when a label has been put to label string. |
| data buffer | array of numbers representing widths of the elements scanned. They must alternate between bars and spaces. |

6.2.2 Decode constants

Constant values are identified in this section. The constants are referenced by name in the description of the algorithm

| Constant name | Value | Description |
| --- | --- | --- |
| frame width | 8 | Number of elements in a character plus the gap. |
| threshold ratio | .70 | Ratio of the width of the widest bar (space) in a character to the wide/narrow decision point. |
| min element ratio | 1.5 | lower limit on the ratio of the width of the widest bar (space) to the narrowest bar (space) in a character. |
| max element ratio | 5.0 | upper limit on the ratio of the width of the widest bar (space) to the narrowest bar (space) in a character. |
| max narrow element ratio | 3.0 | max ratio of the narrowest bar in a character to the narrowest space, or vice versa. |

-continued

| Constant name | Value | Description |
| --- | --- | --- |
| max char ratio | 1.25 | max ratio of the sum of the elements in the current character to last char width, not including the intercharacter gap. |
| min char ratio | .80 | min ratio of the sum of the elements in the current character to last char width, not including the intercharacter gap. |
| max gap ratio | 30 | max ratio of the sum of the elements in the current character to the previous intercharacter gap. |
| min gap ratio | 1.5 | min ratio of the sum of the elements in the current character to the previous intercharacter gap. |
| min margin ratio | 1.0 | min ratio of the width of the white space before the label to the sum of the width of the first three elements of the label. |

6.2.3 Derivation of constants

| | |
| --- | --- |
| threshold ratio | This is chosen to be near the midpoint of the difference between a narrow element and a wide element. For a N:1 wide/narrow ratio the value giving the midpoint is $t = ((N - 1)/2) + 1) * N$. For $N = 3$ $t = .6666$; $N = 2.5$ $t = .7000$; $N = 2$ $t = .7500$. We are using .7000. If a application only used a fixed ratio other than 2.5:1 this could be optimized to match. If labels are rejected due to a wide variation in the width of the narrow elements in the characters $/+% (because of the test for all narrow elements) the ratio could be decreased. |
| min element ratio | This is set to one half of the 2:1 minimum spec value for the wide/narrow ratio. Again, it and other limits could be changed for a particular application. |
| max element ratio | This is set to 5.0 based on the ratio of the widest wide element to the narrowest narrow element when the spec tolerances are applied to a nominal label. The actual worst case ratio is $(3 * .040 + .009)/(.040 - .009) = 4.16$. |
| max narrow element ratio | This is the only comparison other than total character width limiting the size of bars versus spaces. This is based on the spec ratio of a narrow element plus the tolerance to a narrow element minus the tolerance, plus some more to allow for scanning errors and printing errors beyond spec. The limit per spec is $(.040 + .009)/(.040 - .009) = 1.58$. Use 3.0. There is no theoretical upper limit to this, but it shouldn't be set to a value larger than will be seen in a label that is otherwise intact enough to decode. |
| max char ratio min char ratio | These are chosen based on the possible scanning spot velocity variation within a character and the scanning and printing error over the character elements. Character width may vary because of the data containing characters with 2 wide elements or 3 wide elements. At a 3:1 wide/narrow ratio this can result in characters containing 11 or 13 nominal elements. This causes a variation of 11/13 or 13/11 in character width before taking into account other sources of difference. Use 1.25 and .80 until better data for the particular scanning device being used is available. |
| max gap ratio | This is based on the ratio of the sum of the width of the elements in the widest legal character (excluding the gap) to the narrowest gap. In a label with a 3:1 wide/narrow ratio the widest character is 13 nominal elements wide. At .040 inch nominal element size the minimum gap is .040–.009 or .78 nominal. This gives a ratio of 13/.78 = 17. Use 30 to allow for out of spec gap widths. |
| min gap ratio | This is based on the ratio of the sum the width of the of the elements the narrowest legal character (excluding the gap) to the widest gap. In a label with a 2:1 wide/narrow ratio a narrow character is 9 nominal elements wide. The widest gap is 5.3 times a nominal element per spec, for a ratio of 9/5.3 = 1.7. Use 1.5 to allow some extra margin for error. |
| min margin ratio | This is a compromise between enforcing the rigorous spec limits and program efficiency. The minimum white space per spec is 10 times the nominal element size. The sum of the first three elements of the label for a forward label can be 3 to 5 times nominal; for a backward label it can be 4 to 7 times nominal. This results in a min margin of 3 to 7 nominal elements, which allows for out |

-continued

| | |
|---|---|
| | of spec labels and scanning error. |

6.2.4 General Decoding method

For efficiency the data buffer should be searched for a large white space indicating a potential label margin. Then all decoders can start processing from this point, avoiding duplicating the search process. If the decoder doesn't find a good label starting at this position it will exit back to the calling program. Before the decoder is first called some of the status variables must be initialized. They should be set as follows:

| | |
|---|---|
| i | set to point to large white space. |

Before any operation that looks at the data buffer, it is assumed that proper care will be taken to make sure that data is available in the buffer.

Each time the decoder is called it makes the comparison specified by min margin ratio. If this test passes, it looks for a forward or backward start character pattern (A,B,C or D) and tests the elements in the character using threshold ratio, min element ratio, max element ratio, and max narrow element ratio. If this is all ok, the following variables are set:

| | |
|---|---|
| continue decode | true |
| forward | true or false, depending on the character found |
| last char width | set to the sum of the elements in the start character |
| label string | set to empty |
| i | set to the current value of i + frame width. |

Then it continues going through the label elements, appending characters to the label string until an error occurs, the end (A,B,C or D) character is found, or no data is available. For each character, the same checks made for a start character are applied (except the min margin ratio) plus the intercharacter checks for max char ratio, min char ratio, max gap ratio and min gap ratio. If the character found wasn't a stop character and all tests passed, the status variables are updated:

| | |
|---|---|
| last char width | set to the sum of the elements in the character just found |
| label string | the character found is appended to label string |
| i | set to the current value of i plus frame width |

If any test fails, continue decode is set false.

If the character was a stop character, set continue decode false, and check for the trailing margin using min margin ratio. If ok, do any secondary processing such as reversing the label string to correct for a backward scan, evaluating an optional check character, label concatenation, etc. Then if everything is ok set found label true.

The check for a good character pattern is done by finding the widest bar and space in the character, multiplying each by the threshold ratio, then comparing the result to each bar and space in the character to identify the wide and narrow elements. Note that this treats bars and spaces independently. The result is recorded as a binary pattern, one bit per bar or space, with ones indicating wide elements. Since it is possible for a Codabar character pattern to have no wide spaces (which would look like all wide spaces to the above procedure), a separate test must be performed to detect and correct the binary pattern. The binary number resulting from this process is used to select a table entry indicating if a good character was read and what the character was. If a good character pattern was found, the smallest bar and space, and the total character width are determined. Tests for min and max element ratios are done independently for bars and spaces, taking into account the case of all narrow bars being found. The max narrow element ratio test limits the difference between the width of bars and spaces. If all these tests are ok, a good character was found.

6.3 Codabar Decode Algorithm

The decoding algorithm is given below. If any label integrity test fails, an exit from the algorithm will occur with the status variable continue decode set to false. Before caling the decoder set i to a possible margin (wide white space). Information in the scan data buffer is refered to as element(i) for the ith element of the data buffer. During the decoding process i is assumed to point to a margin or intercharacter gap. Follow the steps as specified, starting at 6.3.1.

6.3.1 Set found label false.

6.3.2 If less than frame width counts are available to be examined wait. (Check i+frame width against the last buffer location.)

6.3.3 If min margin ratio>(element(i)/(the sum of element(i+1) through element(i+3)) quit (margin too small).

6.3.4 Use the procedure at starting at step 6.3.11 to check for a character. If forward character is A, B, C, or D set forward true. If backward character is A, B, C, or D set forward false. If neither was found quit (no start char found). Otherwise do the procedure specified starting at step 6.3.16 to check the element widths in the character. If they don't pass the tests, quit (character elements out of limits). Otherwise set continue decode true, set last char width to the sum of the elements in the character computed at step 6.3.16, set label string to empty, and increment i by frame width. An apparent label start has been found.

6.3.5 If less then frame width counts are available to be examined wait. (Check i+frame width against the last buffer location.)

6.3.6 Do the procedure specified starting at step 6.3.11 to get the character pattern. If a legal pattern wasn't found set continue decode false and quit (no char found). Otherwise do the procedure starting at step 6.3.16 to check the element widths in the character. If they don't pass the tests, set continue decode false and quit (character elements out of limits).

6.3.7 Compute the ratio of the sum of the elements in the current character to last char width. If this ratio is greater than max char ratio or less than min char ratio set continue decode false and quit.

6.3.8 Compute the ratio of the sum of the elements in the current character to element(i). If this ratio is greater than max gap ratio or less than min gap ratio set continue decode false and quit.

6.3.9 If forward is true then the current character is the forward character found in step 6.3.6, otherwise the current character is the backward character. If the current character is A, B, C, or D go to 6.3.10. Otherwise if the length of label string is the maximum allowable label length set continue decode false and quit (label string overflow). Otherwise set last char width to the width of the current character, add frame width to i, and append the current character to label string. Go to step 6.3.5.

6.3.10 Set continue decode false. If min margin ratio>element(i+framewidth)/(the sum of element-(i+5) through element(i+7)) then quit. Otherwise if forward is false reverse label string, and do any optional operations for check sum or concatenation (per the referenced spec). If no errors are found set found label true and quit.

6.3.11 This section is referenced from the main flow of the algorithm and you should return to the step which called this one when done here. The elements of the current character will be examined looking for a good character pattern. Find the widest bar and widest space in the seven elements i+1 through i+7. Multiply each of these by threshold ratio to find the wide/narrow breakpoint.

6.3.12 Set a binary number which will represent the wide/narrow pattern to 0. For each of the elements i+1, through i+7 multiply pattern by 2, and increment it by 1 if the element under consideration is greater than the bar or space threshold calculated in step 4.3.11 (use the bar or space threshold as appropriate).

6.3.13 If no narrow space was found set pattern to pattern and 1010101. This will correct for the case of no wide spaces in a character looking appearing to be all wide spaces because of the method used.

6.3.14 Now determine if pattern is one of the allowable values. One way to do this is to use a table having 128 entries to check for a valid pattern and convert it to an index to a character string. If the entry in pattern table (see below) is 0 for the pattern found, the test failed; return. Otherwise set char pointer to the value found in pattern table.

|  | pattern table :array[0 ... 127] = | | | | | | | | | |
|---|---|---|---|---|---|---|---|---|---|---|
| { | 0 | 1 | 2 | 3 | 4 | 5 | 6 | 7 | 8 | 9 } |
| {0} | ( 0, | 0, | 0, | 1, | 0, | 0, | 2, | 0, | 0, | 3, |
| {10} | 0, | 4, | 5, | 0, | 6, | 0, | 0, | 0, | 7, | 0, |
| {20} | 0, | 8, | 0, | 0, | 9, | 0, | 10, | 0, | 0, | 0, |
| {30} | 0, | 0, | 0, | 11, | 0, | 0, | 12, | 0, | 0, | 0, |
| {40} | 0, | 13, | 0, | 0, | 14, | 0, | 0, | 0, | 15, | 0, |
| {50} | 0, | 0, | 0, | 0, | 0, | 0, | 16, | 0, | 0, | 0, |
| {60} | 0, | 0, | 0, | 0, | 0, | 0, | 17, | 0, | 0, | 18, |
| {70} | 0, | 0, | 19, | 0, | 20, | 0, | 0, | 0, | 0, | 0, |
| {80} | 0, | 21, | 0, | 0, | 22, | 0, | 0, | 0, | 0, | 0, |
| {90} | 0, | 0, | 0, | 0, | 0, | 0, | 23, | 0, | 0, | 0, |
| {100} | 0, | 0, | 0, | 0, | 24, | 0, | 0, | 0, | 0, | 0, |
| {110} | 0, | 0, | 0, | 0, | 0, | 0, | 0, | 0, | 0, | 0, |
| {120} | 0, | 0, | 0, | 0, | 0, | 0, | 0, | 0): | | |

6.3.15 Use char pointer to select forward character and backward character from these two lists of 24 characters. For example, if char pointer is two, pick the second character from each list, and so on.

Forward characters:
  012C−D4+$A67BX8X5:9X/.3X
Backward characters:
  389X$X7.−X54XA1D6/2B:+0C
Return to the step in the main algorithm.

6.3.16 This section is referenced from the main flow of the algorithm and you should return to the step which called this one when done here. This section checks the sizes of elements within a character for correct width ratios. It uses the values of widest space and bar and bar pattern which were found previously. Now find the narrowest bar and space, and the sum of the seven elements following i (which make up the current character).

6.3.17 If the ratio of widest bar to narrowest bar is greater than max element ratio or less than min element ratio then return; the test failed.

6.3.18 If the ratio of widest space to narrowest space is greater than max element ratio then return; the test failed.

6.3.19 If wide spaces were found and the ratio of widest space to narrowest space is less than min element ratio then return; the test failed.

6.3.20 If the ratio of narrowest bar to narrowest space is greater than max narrow element ratio then return; the test failed.

6.3.21 If the ratio of narrowest space to narrowest bar is greater than max narrow element ratio then return; the test failed.

6.3.22 Ok, return.

Section 7: Code 93

7.1 General Description of Code 93

See the referenced document for details. This is a code using characters made up of six elements per character with four different width elements used. The narrowest element is defined as being one module wide, with the others being two, three and four modules wide. A character is nine modules wide. There are 48 character patterns defined, with some being used as control characters in a system for encoding the full ASCII character set. Each label contains a variable number of data characters and two mandatory check characters. A method for concatenating labels is also defined. The scan direction is recognized by looking for a forward or backward start character. The code is designed for like edge to like edge decoding. Two term sums are computed and used to decode the characters.

7.2 Overview of the Algorithm

Variables and constants used in the decoding process are defined below, followed by a brief description of the decoding algorithm. A detailed description of the algorithm follows in the next section.

7.2.1 Status variables

Values of the status variables can be maintained globally to allow re-entrant use of the decoder.

| Variable name | Description |
|---|---|
| i | pointer to the current element in the data buffer. This always points to a space when the decoder is called. |
| last char width | sum of the element widths in the last character decoded in the current label. |
| label string | decoded characters as an ASCII string. |
| forward | boolean; true if decoding in forward direction. |
| continue | boolean; true while the buffer at the current element looks like good data. |
| decode | |
| found label | boolean; true when a label has been put into label string. |
| data buffer | array of numbers representing widths of the elements scanned. They must alternate between bars and |

-continued

| Variable name | Description |
|---|---|
| | spaces. |

7.2.2 Decode constants

Constant values are identified in this section. The constants are referenced by name in the description of the algorithm.

| Constant name | Value | Description |
|---|---|---|
| frame width | 6 | Number of elements in a character. |
| threshold ratio 1 | 2.5/9 | Used to determine value of two |
| threshold ratio 2 | 3.5/9 | term sums. |
| threshold ratio 3 | 4.5/9 | |
| max element ratio | 8.0 | upper limit on the ratio of the width of the widest bar (space) to the narrowest bar (space) in a character. |
| max char ratio | 1.25 | max ratio of the sum of the elements in the current character to last char width, not including the intercharacter gap. |
| min char ratio | .80 | min ratio of the sum of the elements in the current character to last char width, not including the intercharacter gap. |
| min margin ratio | 1.0 | min ratio of the width of the white space before the label to three times the sum of the width of the first two elements of the label. |
| stop element ratio | 2.0 | max value of either the ratio of the width of the last bar of a stop character to the next to the last bar, or the inverse of that ratio. |

7.2.3 Derivation of constants

| | |
|---|---|
| threshold ratio 1 | This is chosen to be near the midpoint of the difference between a two term sum of two one module elements (2 modules total) and a two term sum of a one module element and a two module element (3 modules total). It is normalized to the 9 module character size. |
| threshold ratio 2 | Similar to threshold 1, it is the breakpoint between 3 module and 4 module two term sums. |
| threshold ratio 3 | This is the breakpoint between 4 module and 5 module two term sums. |
| max char ratio, min char ratio | These are chosen based on the possible scanning spot velocity variation within a character and the scanning and printing error over the character elements. Use 1.25 and .80 until better data for the particular scanning device being used is available. |
| min margin ratio | This is a compromise between enforcing the rigorous spec limits and program efficiency. The minimum white space per spec is 10 times the nominal module size. The sum of the first two elements of a forward or backward label is 2 nominal modules. Checking for a margin of at least three times this results is a min margin of 6 nominal modules, which allows for out of spec labels and scanning error. |
| stop element ratio | This is not critical, and is used to check that the width of the last bar is similar to the width of the other elements in the stop character. |

7.2.4 General Decoding method

For efficiency the data buffer should be searched for a large white space indicating a potential label margin. Then all decoders can start processing from this point, avoiding duplicating the search process. If the decoder doesn't find a good label starting at this position it will exit back to the calling program. Before the decoder is first called some of the status variables must be initialized. They should be set as follows:

| | |
|---|---|
| i | set to point to large white space. |

Before any operation that looks at the data buffer, it is assumed that proper care will be taken to make sure that data is available in the buffer.

Each time the decoder is called it makes the comparison specified by min margin ratio. If this test passes, it looks for a forward or backward start character pattern and tests the elements in the character using the threshold ratios and max element ratio. If this is all ok, the following variables are set:

| | |
|---|---|
| continue decode | true |
| forward | true or false, depending on the character found |
| last char width | set to the sum of the elements in the start character |
| label string | set to empty |
| i | set to the current value of i + frame width. |

Then it continues going through the label elements, appending characters to the label string until an error occurs, the end character is found, or no data is available. For each character, the same checks made for a start character are applied (except the min margin ratio) plus the intercharacter checks for max char ratio and min char ratio. If the character found wasn't a stop character and all tests passed, the status variables are updated:

| | |
|---|---|
| last char width | set to the sum of the elements in the character just found |
| label string | the character found is appended to label string |
| i | set to the current value of i plus frame width |

If any test fails, continue decode is set false.

If the character was a stop character, set continue decode false, and check for the trailing margin using min margin ratio. If ok, do any secondary process such as reversing the label string to correct for a backward scan, evaluating the two check characters, optional label concatenation, etc. Then if everything is ok set found label true.

The check for a good character pattern is done by finding the sum of the elements in the character (total width), then computing three threshold values by multiplying each of the three threshold ratio values by the total width. Then four two term sums are calculated, and a determination made of whether each sum is 2, 3, 4, or 5 modules in size. The resulting four digits are used to look up the proper character code. If the label is being scanned backward the two term sums are calculated from the other end of the character, resulting in the same set of sums. Provision must be made to find a forward or backward start characeter in order to identify direction initially, but all other characters will always have a single representation. If a good character is found the max element ratio is checked. This requires finding the narrowest and widest bars and spaces. If this test is ok a the character is ok.

7.3 Code 93 Decode Algorithm

The decoding algorithm is given below. If the label integrity test fails, an exit from the algorithm will occur with the status variable continue decode set to false. Before calling the decoder set i to a possible margin (wide white space). Information in the scan data buffer is refered to as element(i) for the ith element of the data buffer. During the decoding process i is assumed to point to a margin or space. Follow the steps as specified, starting at 7.3.1.

7.3.1 Set found label false.

7.3.2 If less then frame width counts are available to be examined wait. (Check i+frame width against the last buffer location.)

7.3.3 If min margin ratio>(element(i)/3*(the sum of element(i+1) and element(i+2) quit (margin too small).

7.3.4 Set forward true. Use the procedure at starting at step 7.3.12 determine the hex value representing the character. If pattern is 2225 the label really is forward. If pattern is 2552 then set forward false. If neither was found quit (no start char found). If forward is false and element(i+1)/element(i+3)>stop element ratio, or element (i+3)/element(i+1)>stop element ratio, quit. Otherwise do the procedure specified starting at step 7.3.17 to check the element widths in the character. If they don't pass the tests, quit (character elements out of limits). Otherwise set continue decode true, set last char width to the sum of the elements in the character computed at step 7.3.12, set label string to empty, and increment i by frame width. An apparent label start has been found.

7.3.5 If less than 8 counts are available to be examined wait. (Check i+frame width against the last buffer location.)

7.3.6 Do the procedure specified starting at step 7.3.12 to get the character pattern. Look up the character corresponding to the pattern found. A fast method should be used. A decision tree which branches at each digit for the first one or two digits and has the character values at the leaves can be used. The following table gives the pattern to character conversion. The start and special character patterns are denoted by otherwise unused characters. (The characters actually sent from the decoder are chosen in a later step).

| | | |
|---|---|---|
| 2222: char = '7' | 3324: char = '—' | |
| 2223: char = 'L' | 3332: char = 'Q' | |
| 2225: char = '(' fwd start | 3333: char = '5' | |
| 2233: char = '1' | 3334: char = '!' | ^S char |
| 2234: char = 'M' | 3343: char = 'R' | |
| 2244: char = '2' | 3344: char = '6' | |
| 2245: char = 'N' | 3432: char = 'J' | |
| 2255: char = '3' | 3433: char = 'Y' | |
| 2332: char = 'G' | 3443: char = '&' | ^+ char |
| 2333: char = 'W' | 3542: char = 'Z' | |
| 2334: char = '/' | 4222: char = '.' | |
| 2343: char = 'H' | 4223: char = '#' | ^/ char |
| 2344: char = 'X' | 4233: char = ' ' | |
| 2354: char = 'I' | 4322: char = 'D' | |
| 2443: char = '+' | 4323: char = 'U' | |
| 2552: char = ')' bkwd start | 4332: char = ' ' | ^% char |
| 3222: char = 'A' | 4333: char = 'E' | |
| 3223: char = 'S' | 4422: char = 'O' | |
| 3224: char = '%' | 4423: char = 'P' | |
| 3233: char = 'B' | 4432: char = 'V' | |
| 3234: char = 'T' | 4433: char = '8' | |
| 3244: char = 'C' | 4532: char = 'K' | |
| 3322: char = '4' | 5322: char = '$' | |
| 3323: char = '0' | 5422: char = 'F' | |
| | 5522: char = '9' | |

7.3.7 If a legal pattern wasn't found set continue decode false and quit (no char found). Otherwise do the procedure starting at step 7.3.17 to check the element widths in the character. If they don't pass the tests, set continue decode false and quit (character elements out of limits).

7.3.8 Compute the ratio of the sum of the elements in the current character to last char width. If this ratio is greater than max char ratio or less than min char ratio set continue decode false and quit.

7.3.9 If current character is start/stop then go to 7.3.11.

7.3.10 If the length of label string is the maximum allowable label length set continue decode false and quit (label string overflow). Otherwise set last char width to the width of the current character, add frame width to i, and append the current character to label string. Go to step 7.3.5.

7.3.11 Set continue decode false. If min margin ratio>element(i+8)/3*(the sum of element(i+6) plus element(i+7)) then quit. If forward is true then quit if element(i+7)/element(i+5)>stop element ratio, or if element(i+5)/element(i+7)>stop element ratio. Otherwise if forward is false reverse label string, and do the check sum calculations. If ok search through the label for any shift characters and replace the shift character and the following character with the correct character according to the table in the referenced spec. The shift characters are represented in the label string as follows:

circle $ is a !
circle + is a &
circle % is an @
circle / is a #.

Next do any optional operations such as concatenation (per the referenced spec). If no errors are found set found label true. Quit.

7.3.12 This section is referenced from the main flow of the algorithm and you should return to the step which called this one when done here. The elements of the current character will be examined looking for a good character pattern. If forward is true find the total character width by adding element(i+1) through element(i+6), otherwise by adding element- (i+2) through element(i+7). Now if forward is true go to step 7.3.13, otherwise go 7.3.14.

7.3.13 Calculate four two term sums T1 through T4 as follows.
T1=element(i+1)+element(i+2)
T2=element(i+2)+element(i+3)
T3=element(i+3)+element(i+4)
T4=element(i+4)+element(i+5)
Go to 7.3.15.

7.3.14 Calculate four two term sums T1 through T4 as follows.
T1=element(i+6)+element(i+7)
T2=element(i+5)+element(i+6)
T3=element(i+4)+element(i+5)
T4=element(i+3)+element(i+4)

7.3.15 Compute three threshold values thresh 1, thresh 2, thresh 3 by multiplying the total character width times threshold ratio 1 through threshold ratio 3.

7.3.16 Compute the four digits D1 through D4 of the pattern by doing the following for each sum T1 through T4. For j 1 through 4 do the following:
Dj=2 if Tj<thresh 1.
Dj=3 if thresh 1<=Tj<thresh 2.
Dj=4 if thresh 2<=Tj<thresh 3.
Dj=5 if thresh 3<=Tj.
Then pattern is equal to D4+16*D3+256*D2+4096*D1 (do this by shifting and adding as they are computed). Return to the step in the main algorithm.

7.3.17 This section is referenced from the main flow of the algorithm and you should return to the step which called this one when done here. This section checks the sizes of elements within a character for correct width ratios. Find the widest and narrowest bar and space.

7.3.18 If the ratio of widest bar to narrowest bar is greater than max element ratio then return; the test failed.

7.3.19 If the ratio of widest space to narrowest space is greater than max element ratio then return; the test failed.

7.3.20 Ok, return.

Section 8: Code 128

8.1 General Description of Code 128

See the reference document for details. This a code using characters made up of six elements per character with four different width elements used. The narrowest element is defined as being one module wide, with the others being two, three and four modules wide. A character is eleven modules wide. The bars in a character are made up of an even number of modules (even parity). Character parity is checked in the decoding process. There are 107 character patterns defined, including three different start characters, one stop character, several to select which of the three different pattern to character translations to use (code A, B, or C), and four decoder control functions. The choice of start character determines which pattern to character translation is used initially. Each label contains a variable number of data characters and a mandatory check character. A method for concatenating labels is also defined. The scan direction is recognized by looking for a forward or backward start or stop character. The code is designed for like edge to like edge decoding. Two term sums are computed and used to decode the characters.

8.2 Overview of the Algorithm

Variables and constants used in the decoding process are defined below, followed by a brief description of the decoding algorithm. A detailed description of the algorithm follows in the next section.

8.2.1 Status variables

Values of the status variables can be maintained globally to allow re-entrant use of the decoder.

| Variable name | Description |
|---|---|
| i | pointer to the current element in the data buffer. This always points to a space when the decoder is called. |
| last char width | sum of the element widths in the last character decoded in the current label. |
| label string | decoded characters as an ASCII string. |
| forward | boolean; true if decoding in forward direction. |
| continue decode | boolean; true while the buffer at the current element looks like good data. |
| found label | boolean; true when a label has been put into label string. |
| data buffer | array of numbers representing widths of the elements scanned. They must alternate between bars and spaces. |

8.2.2 Decode constants

Constant values are identified in this section. The constants are referenced by name in the description of the algorithm

| Constant name | Value | Description |
|---|---|---|
| frame width | 6 | Number of elements in a character. |
| threshold ratio 1 | 2.5/11 | Used to determine value of two term sums. |
| threshold ratio 2 | 3.5/11 | |
| threshold ratio 3 | 4.5/11 | |
| threshold ratio 4 | 5.5/11 | |
| threshold ratio 5 | 6.5/11 | |
| max element ratio | 8.0 | upper limit on the ratio of the width of the widest bar (space) to the narrowest bar (space) in a character. |
| max char ratio | 1.25 | max ratio of the sum of the elements in the current character to last char width, not including the intercharacter gap. |
| min char ratio | .80 | min ratio of the sum of the elements in the current character to last char width, not including the intercharacter gap. |
| min margin ratio | 1.0 | min ratio of the width of the white space before the label to two times the sum of the width of the first two elements of the label. |
| stop element ratio | 2.0 | max value of either the ratio of the last bar of a stop char to the first bar, or the inverse of that ratio. |

8.2.3 Derivation of constants

| | |
|---|---|
| threshold ratio 1 | This is chosen to be near the midpoint of the difference between a two term sum of two one module elements (2 modules total) and a two term sum of a one module element and a two module element (3 modules total). It is normalized to the 11 module character size. |
| threshold ratio 2 | Similar to threshold 1, it is the breakpoint between 3 |

| | |
|---|---|
| threshold ratio 3 | This is the breakpoint between 4 module and 5 module two term sums. |
| threshold ratio 4 | This is the breakpoint between 5 module and 6 module two term sums. |
| threshold ratio 5 | This is the breakpoint between 6 module and 7 module two term sums. |
| max char ratio, min char ratio | These are chosen based on the possible scanning spot velocity variation within a character and the scanning and printing error over the character elements. Use 1.25 and .80 until better data for the particular scanning device being used is available. |
| min margin ratio | This is a compromise between enforcing the rigerous spec limits and program efficiency. The minimum white space per spec is 10 times the nominal module size. The sum of the first two elements of a forward or backward label is 3 nominal modules. Checking for a margin of at least two times this results is a min margin of 6 nominal modules, which allows for out of spec labels and scanning error. |
| stop element ratio | This is not critical, and is used to check that the width of the last bar is similar to the width of the other elements in the stop character. |

8.2.4 General decoding method

For efficiency the data buffer should be searched for a large white space indicating a potential label margin. Then all decoders can start processing from this point, avoiding duplicating the search process. If the decoder doesn't find a good label starting at this position it will exit back to the ceiling program. Before the decoder is first called some of the status variables must be initialized. They should be set as follows:

| | |
|---|---|
| i | set to point to large white space. |

Before any operation that looks at the data buffer, it is assumed that proper care will be taken to make sure that data is available in the buffer.

Each time the decoder is called it makes the comparison specified by min margin ratio. If this test passes, it looks for a forward or backward start or stop character pattern and tests the elements in the character using the threshold ratios and max element ratio. If this is all ok, the following variables are set:

| | |
|---|---|
| continue decode | true |
| forward | true or false, depending on the character found |
| last char width | set to the sum of the elements in the start character |
| label string | set to empty |
| i | set to the current value of i + frame width. |

All processing to translate code sets A, B, and C takes place after the complete label has been found.

Next it continues going through the label elements, appending characters to the label string until an error occurs, the end character is found, or no data is available. For each character, the same checks made for a start character are applied (except the min margin ratio) plus the intercharacter checks for max char ratio and min char ratio. If the character found wasn't a stop or backward start character and all tests passed, the status variables are updated:

| | |
|---|---|
| last char width | set to the sum of the elements in the character just found |
| label string | the character found is appended to label string |
| i | set to the current value of i plus frame width |

If any test fails, continue decode is set false.

If the character was a stop or backward starter, set continue decode false, and check for the trailing margin using min margin ratio. If ok, do any secondary processing such as reversing the label string to correct for a backward scan, evaluating the two check characters, optional label concatenation, etc. Then if everything is ok set found label true.

The check for a good character pattern is done by finding the sum of the elements in the character (total width), then computing five threshold values by multiplying each of the five threshold ratio values by the total width. Then four two term sums are calculated, and a determination made of whether each sum is 2, 3, 4, 5, 6 or 7 modules in size. The resulting four digits are used to look up the proper character code. If the label is being scanned backward the two term sums are calculated from the other end of the character, resulting in the same set of sums. Provision must be made to find forward start characters and forward or backward stop characters in order to identify direction initially, but all other characters will always have a single representation. If a good character is found the max element ratio is checked. This requires finding the narrowest and widest bars and spaces. If this test is ok a the character is ok.

8.3 Code 128 Decode Algorithm

The decoding algorithm is given below. If any label integrity test fails, an exit from the algorithm will occur with the status variable continue decode set to false. Before calling the decoder set i to a possible margin (wide white space). Information in the scan data buffer is refered to as element(i) for the ith element of the data buffer. During the decoding process i is assumed to point to a margin or space. Follow the steps as specified, starting at 8.3.1.

8.3.1 Set found label false.

8.3.2 If less then frame width counts are available to be examined wait. (Check i+frame width against the last buffer location.)

8.3.3 If min margin ratio>(element(i)/2*(the sum of element(i+1) and element(i+2)) quit (margin too small).

8.3.4 Set forward true. Use the procedure at starting at step 8.3.11 to determine the hex value representing the character. If pattern is any of the following set label string as shown:

| pattern: | 3255 | label string: character | 103 (start A) |
|---|---|---|---|
| | 3233 | | 104 (start B) |
| | 3235 | | 105 (start C) |
| | 3224 | | 107 (backward stop) |

If pattern was backward stop set forward false. If none of the four patterns were found quit. Check the character parity as specified in step 8.3.7. If bad quit (parity error). Otherwise do the procedure specified starting at step 8.3.16 to check the element widths in the character. If they don't pass the tests, quit (character elements out of limits). Otherwise if forward false and element(i+7)/element(i+1)>stop element ratio, or if forward false and element(i+1)/element-(i+7)>stop element ratio, quit. Otherwise set continue decode true, set last char width to the sum of the elements in the character computed at step 8.3.11, and increment i by frame width. An apparent label start has been found.

8.3.5 If less then 8 counts are available to be examined wait. (Check i+frame width against the last buffer location.)

8.3.6 Do the procedure specified starting at step 8.3.11 to get the character pattern. Look up the character corresponding to the pattern found. A fast method should be used. A decision tree which branches at each digit for the first one or two digits and has the character values at the leaves can be used. The following table gives the pattern to character conversion. The start and special character patterns are denoted by otherwise unused characters. (The characters actually sent from the decoder are chosen in a later step.)

| | | |
|---|---|---|
| 2225 char= 92 | 3434 char= 13 | 4534 char= 44 |
| 2234 char= 63 | 3442 char= 51 | 4542 char= 22 |
| 2236 char= 80 | 3443 char= 6 | 4543 char= 8 |
| 2245 char= 33 | 3444 char= 53 | 4552 char= 60 |
| 2247 char= 93 | 3445 char= 14 | 4553 char= 18 |
| 2256 char= 64 | 3453 char= 21 | 4554 char= 38 |
| 2334 char= 42 | 3454 char= 7 | 4643 char= 47 |
| 2343 char= 69 | 3464 char= 52 | 4752 char= 79 |
| 2345 char= 12 | 3465 char= 72 | 5222 char= 97 |
| 2354 char= 36 | | 5224 char= 102 |
| 2356 char= 43 | 3543 char= 16 | 5233 char= 86 |
| 2365 char= 70 | 3553 char= 90 | 5244 char= 98 |
| 2443 char= 45 | 3554 char= 17 | 5323 char= 25 |
| 2445 char= 99 | 3652 char= 84 | 5333 char= 91 |
| 2454 char= 15 | 3663 char= 85 | 5334 char= 26 |
| 2465 char= 46 | 4223 char= 54 | 5422 char= 40 |
| 2552 char= 95 | 4225 char= 101 | 5424 char= 50 |
| 2554 char= 100 | 4234 char= 24 | 5432 char= 28 |
| 2563 char= 83 | 4245 char= 55 | 5433 char= 11 |
| 2574 char= 96 | 4322 char= 76 | 5442 char= 77 |
| 3224 char= 107 bkwd stop | 4324 char= 19 | 5443 char= 29 |
| 3233 char= 104 start b | 4332 char= 57 | 5444 char= 41 |
| 3235 char= 105 start c | 4333 char= 9 | 5523 char= 67 |
| 3244 char= 39 | 4334 char= 23 | 5533 char= 32 |
| 3246 char= 49 | 4335 char= 20 | 5534 char= 68 |
| 3255 char= 103 start a | 4343 char= 27 | 5632 char= 73 |
| 3323 char= 65 | 4344 char= 10 | 5642 char= |
| 3325 char= 81 | 4354 char= 58 | 5643 char= 74 |
| 3333 char= 30 | 4355 char= 61 | 6322 char= 87 |
| 3334 char= 3 | 4423 char= 34 | 6333 char= 88 |
| 3335 char= 89 | 4425 char= 94 | 6423 char= 56 |
| 3336 char= 82 | 4433 char= 1 | 6522 char= 78 |
| 3344 char= 0 | 4434 char= 5 | 6532 char= 59 |
| 3345 char= 4 | 4443 char= 48 | 6533 char= 75 |
| 3355 char= 31 | 4444 char= 2 | 7422 char= 62 |
| 3356 char= 66 | 4445 char= 35 | |
| 3432 char= 71 | 4532 char= 37 | |

(5642 char= 106 fwd stop)

8.3.7 If a legal pattern wasn't found set continue decode false and quit (no char found). Otherwise check for a parity error by using the character value just found as an index into the following table to get a value V. Then if $(V+1.75)/11 <$ bar total or $(V-1.75)/11 >$ bar total set continue decode false and quit (parity error). Otherwise do the procedure starting at step 8.3.16 to check the element widths in the character. If they don't pass the tests, set continue decode false and quit (character elements out of limits).

| v table (0 to 107) |
|---|
| {0} 6,6,6,4,4,4,4,4,4,4, |
| {10} 4,4,6,6,6,6,6,6,6,6, |
| {20} 6,6,6,8,6,6,6,6,6,6, |
| {30} 6,6,6,4,4,4,4,4,4,4, |
| {40} 4,4,6,6,6,6,6,8,6, |
| {50} 6,6,6,8,6,6,6,6,6,6, |
| {60} 8,4,6,4,4,4,4,4,4,4, |
| {70} 4,4,4,4,4,4,4,8,4,6, |
| {80} 6,6,6,6,6,6,6,6,6,8, |
| {90} 8,8,6,6,6,6,6,6,6,8, |
| {100} 8,8,8,4,4,6,6,6 |

8.3.8 Compute the ratio of the sum of the elements in the current character to last char width. If this ratio is greater than max char ratio or less than min char ratio set continue decode false and quit.

8.3.9 If the length of label string is the maximum allowable label length set continue decode false and quit (label string overflow). Otherwise if current character si start (103, 104, 105) or stop (106) than go to 8.3.10. Otherwise set last char width to the width of the current character, add frame width to i, and append the current character to label string. Go to step 8.3.5.

8.3.10 Set continue decode false. If min margin ratio>element(i+8)/2*(the sum of element(i+6) plus element(i+7)) then quit. Otherwise if forward is true then quit if either element(i+7)/element(i+1)>stop element ratio, or element(i+1)/element(i+7)>stop element ratio. Otherwise if forward is false reverse label string, and do the check sum calculation. If ok use the label string to construct the actual output string using the character table in the referenced spec. The values in label string give the entry for the "value" column in the table. Follow the rules to keep track of the current code when translating the data. The four function characters should be communicated to the control software for the decoder. If no errors are found set found label true. Quit.

8.3.11 This section is referenced from the main flow of the algorithm and you should return to the step which called this one when done here. The elements of the current character will be examined looking for a good character pattern. If forward is true go to step 8.3.12, otherwise go 8.3.13.

8.3.12 Find the total character width by adding elements i+1 through i+6. Calculate four two term sums T1 through T4 as follows.
T1=element(i+1)+element(i+2)
T2=element(i+2)+element(i+3)
T3=element(i+3)+element(i+4)
T4=element(i+4)+element(i+5)
Set bar total=(element(i+1)+element(i+3-)+element(i+5)/total character width.
Go to 8.3.14.

8.3.13 Find the total character width by adding elements i+2 through i+7. Calculate four two term sums T1 through T4 as follows.
T1=element(i+6)+element(i+7)
T2=element(i+5)+element(i+6)
T3=element(i+4)+element(i+5)
T4=element(i+3)+element(i+4)
Set bar total=(element(i+3)+element(i+5-)+element(i+7))/total character width.

8.3.14 Compute five threshold values thresh 1, through thresh 5 by multiplying the total character width times threshold ratio 1 through threshold ratio 5.

8.3.15 Compute the four digits D1 through D4 of the pattern by doing the following for each sum T1 through T4. For j 1 through 4 do the following:
Dj=2 if Tj<thresh 1.
Dj=3 if thresh1<=Tj<thresh 2.
Dj=4 if thresh2<=Tj<thresh 3.
Dj=5 if thresh3<=Tj<thresh 4.
Dj=6 if thresh4<=Tj<thresh 5.
Dj=7 if thresh5<=Tj.
Then pattern is equal to D4+16*D3+256*D2+4096*D1 (do this by shifting and adding as they are computed). the main algorithm.

8.3.16 This section is referenced from the main flow of the algorithm and you should return to the step which called this one when done here. This section checks the sizes of elements within a character for correct width ratios. Find the widest and narrowest bar and space.

8.3.17 If the ratio of widest bar to narrowest bar is greater than max element ratio then return; the test failed.

8.3.18 If the ratio of widest space to narrowest space is greater than max element ratio then return; the test failed.

8.3.19 Ok, return.

Section 9: UPC/EAN

9.1 General Code Description

A UPC/EAN label consists of one or more segments each representing a fixed number (4, 6 or 7) of numeric digits. This information is encoded in segments with a length of 4 or 6 characters. Each segment in the label can be scanned and decoded independently, without regard to order of segment capture or direction of scan.

9.1.1 Basic Structure

The widths of the alternating bars and spaces of the UPC/EAN label are defined in terms of modules. A module is a normalization factor used to compute element sizes when decoding the label. A module is generally the smallest of a group of elements making up specific sections of the label. All measurements and ratios used in the decoding algorithm are based on module widths.

9.1.2 Character Structure

Each character of a segment consists of a group of 4 elements, 2 bars and 2 spaces. Characters have a constant width of 7 modules with each element either 1, 2, 3 or 4 modules wide. Differing patterns of these 4 elements can be uniquely decoded to produce 20 characters, 0–9 both with even and odd parity. Parity is determined by the number of modules that make up the bars of the character pattern. The parity, and the direction in which the pattern was scanned (whether the character pattern starts with a space or bar), are used in conjunction with the segment to determine if the label had been scanned in a forward or backward direction.

9.1.3 Segment Structure

A segment comprises either 4 or 6 explicit characters. A seventh character is implicitly encoded into certain types of segments using the parity pattern. Segments are generally grouped into left and right halves. A left half segment and a right half segment are usually joined together by a center band. A center band is a pattern of 5 elements (3 spaces, 2 bars) that are each one module in width. The joined segments are surrounded on both sides with a margin (relatively large white space) and a guard bar pattern (3 one module elements, 2 bars, separated by one space). When scanned from left to right (forward direction), characters in the left half segment start with a space. The segment ends at the center band, and the right segment characters (scanned from the center band out) start with a mark (bar). Thus, the type of element that the character patterns in the segment start with determine the relative direction that the label was scanned (margin to center band, or center band to margin). The parity pattern generated by the segment characters is used to identify a left or right half segment. These two pieces of information identify the type of segment and order of the encoded data. Certain types of left half segments are not joined by corresponding right halves. These segments have a left margin and guard bar pattern and a center band pattern on the right. The center band contains an extra 1 module bar on the right to separate the last space from the margin.

9.1.4 Label Structure

Specific label types are formed with 1 or more unique segments. UPC type A labels have a six character left and right half for a total of 12 characters. UPC type E (zero suppressed) labels have 1 six character left half with a modulo 10 check digit encoded as a seventh character in the parity pattern. EAN-13 labels have 2 six character halves, with a 13th digit encoded in the left half segment parity pattern. EAN-8 labels have one left and one right 4 character half, for 8 digits of encoded data. UPC type D labels (D-1 thru D-5) have various combinations of both 4 and 6 character segments creating labels with 14 to 32 digits of data. Segment halves or pairs are separated within the label by intra-block and inter-block gap elements. These are essentially margin elements with a minimum nominal width of 7 modules.

9.1.5 Supplemental Addon Encodation

UPC A and E, EAN13, and EAN8 labels can be suffixed past the right margin by supplementally encoded data (also called periodical data, because it is used primarily by the magazine and book industry) of length 2 or 5 characters. The data immediately follows the right margin (7 modules nominal) and is deliniated by a guard bar pattern of 3 elements (1 module bar, 1 module space, 2 module bar). Character patterns are separated by 2 elements (1 module space, 1 module bar), and a margin element immediately follows the last character. The supplemental encoding scheme was purposely designed so as to not interfere with the decoding of the standard UPC/EAN label, but also with the ability to utilize some of the already existing decoding schemes (such as character pattern recognition) in a UPC/EAN decoder. Because of its nature, the supplemental encodation is more susceptible to error than standard UPC/EAN label types.

| CHARACTER | EVEN PARITY $B_1S_1B_2S_2$ | $T_1T_2$ | ODD PARITY $B_1S_1B_2S_2$ | $T_1T_2$ |
|---|---|---|---|---|
| 0 | 3 2 1 1 | 5 3 | 1 1 2 3 | 2 3 |
| 1 | 2 2 2 1 | 4 4 | 1 2 2 2 | 3 4 |
| 2 | 2 1 2 2 | 3 3 | 2 2 1 2 | 4 3 |
| 3 | 1 4 1 1 | 5 5 | 1 1 4 1 | 2 5 |
| 4 | 1 1 3 2 | 2 4 | 2 3 1 1 | 5 4 |
| 5 | 1 2 3 1 | 3 5 | 1 3 2 1 | 4 5 |
| 6 | 1 1 1 4 | 2 2 | 4 1 1 1 | 5 2 |
| 7 | 1 3 1 2 | 4 4 | 2 1 3 1 | 3 4 |
| 8 | 1 2 1 3 | 3 3 | 3 1 2 1 | 4 3 |
| 9 | 3 1 1 2 | 4 2 | 2 1 1 3 | 3 2 |

FIG. 9.1: Bar ($B_i$) Space ($S_i$) and 2-term sum ($T_i$) information for each UPC/EAN character. When scan direction is such that character starts with a space, then character elements should be reversed. Note that segments containing both odd and even parity characters will contain reversed characters.

9.2 Decoding Algorithm Overview

9.2.1 Decode Status Variables

Variables used in the decoding process are defined below. Values of the status variables can be maintained globally to allow re-entrant use of the decoder.

| Variable name | Description |
|---|---|
| i | pointer to the current element in the data buffer. This always points to a space when the decoder is called. |
| is | pointer to the current element being analyzed for supplemental addon data. |
| current margin | pointer to the last space that was determined to be a margin. |
| last decode point | pointer to the last point where data in the data buffer was either decoded or rejected as bad. This pointer limits decode attempts in the backward direction to data where no attempt to decode has taken place. |
| first buffer element | pointer to oldest valid data in the data buffer. |
| last char width | sum of the element widths in the last character decoded in the current segment. |
| label string | decoded characters of a fully formed label stored as an ASCII string. |
| segment string | decoded characters of a segment stored as an ASCII string. These are accumulated in the segment store. |
| addon string | decoded characters of the addon segment stored as an ASCII string. |
| fwd data available | boolean; true if the buffer has more elements to decode in the forward direction. |
| continue decode | boolean; true when decoding and the buffer at the current element looks like good data. |
| fwd decode | boolean; true when attempting decode of the buffer in forward direction (false if backwards). |
| bkwd data available | boolean; true if the buffer has more elements to decode in the backward direction. |
| addon data available | boolean; true if the buffer has more elements to decode for the addon. |
| continue decode addon | boolean; true when decoding in the addon and the buffer up to the current element looks like good data. |
| fwd decode addon | boolean; true when attempting decode of the buffer in forward direction (false if backwards). |
| found segment | boolean; true when a segment has been put into the segment buffer. |
| reverse | boolean; true if a segment was decoded from center-band out to the margin. |
| found addon | boolean; true when an addon segment has been put into the addon buffer. |
| found label | boolean; true when a label has been put into label string. |
| parity bits | array of six bits representing the parity pattern of the segment decoded. A 1 bit indicates EVEN parity. |
| addon parity bits | array of 2 or 5 bits representing the parity pattern of the addon segment decoded. A 1 bit indicates even parity. |
| segment type | variable indicating the type of segment in the segment buffer (UPC-A right, EAN-13 left, etc.). |
| segment store | array of buffers storing decoded segments as ascii strings. |
| data buffer | array of numbers representing widths of the elements scanned. They must alternate between bars and |

-continued

| Variable name | Description |
|---|---|
| | spaces. |

Note: It is possible in an actual implementation of this algorithm to use one variable to represent several of the above. The variables were separated to allow for more clarity in the algorithm descriptions.

9.2.2 Decode Constants

Constant values are identified in this section. The constants are referenced by name in the description of the algorithm

| Constant | Value | Description |
|---|---|---|
| frame width | 4 | Number of elements in a character |
| threshold 1,2,& 3 | 25/70 35/70 45/70 | Decision points used to base weightings of the 2-term sums expressed as ratio of sum to character width. |
| ambiguity scale | 2/3 | Utilized to scale a character element width for ambiguity resolution. |
| max char ratio | 1.25 | Max ratio of the sums of the elements in the current character to the previous character. |
| min char ratio | .80 | 1/max char ratio is the min char ratio |
| margin scaler | 1.75 | Factor used to scale margin guard bar sum (2 bar plus 2 times the space), to make it comparable to a character width. |
| max margin char ratio | 2 | Max ratio of the sums of the elements in the first character of the segment to the margin (margin is multiplied by the margin scaler constant). 1/max margin char ratio is the min margin char ratio. |
| min margin ratio | 1.375 | Minimum ratio of a white space to the sum of the next 2 bars plus 2 times the next space (next three elements, either forward or backward) to qualify it as a margin element. |
| max margin ratio | 3 | Max ratio of a white space to the sum of the next 2 bars plus 2 times the next space (next 3 elements, either forward or backward) to qualify it a legal gap between label segment and add-on segment. |
| max like element ratio | 1.5 | Max ratio of two 1 module wide elements when both are bars or both are spaces. |
| max addon guard bar ratio, min addon guard bar ratio | 2.5 1.5 | Max and min ratio of the second bar (third element) to the first bar (first element) of an addon segment. |

9.2.3 Derivation of the constants

| | |
|---|---|
| threshold 1,2,& 3 | Detail on the choice of these numbers is descibed in section 9.2.4.1. Basically, it is the midpoint between nominal ratios of the 2-term sums of the character to sum of all elements in the character (character width). Since nominal ratios are 2/7, 3/7, 4/7, and 5/7, the thresholds are set as 2.5/7, 3.5/7 and 4.5/7. |
| ambiguity scale | This is used as a constant to scale $I_2$ as described in section 9.2.4.1 when resolving EVEN 1,7 ambiguity. Since the possible ratios of $I_1$ to $I_2$ are 1/3 and 1, scaling $I_2$ by 2/3 (.6667) results in ratios of 1/2 and 3/2. Choosing ratio of 1 as decision point is near midpoint between these two extremes, and allows simple magnitude comparison of the elements (ie. which is greater). |
| max char ratio | This value is chosen based on the possible variation in spot velocity and label printing tolerances. 1.25 is used until more information becomes available on the scanning device used. For example, rotating polygon scanners generally have less spot speed variation than resonant scanners. Resonant scanners would, therefore need a larger range of character ratios (larger max char ratio constant) than polygon scanners. |
| margin scaler | This number is used to calculate a "character width" for the margin guard band. The measured width (bars + 2 * space) is nominally 4 modules. Multiplication by 7/4 (1.75) gives a pseudo width of 7 modules (which is a nominal character width). This number can then be compared directly with the subsequent character in the label. |
| max margin char | Since the margin "character width" is calculated rather |

-continued

| | |
|---|---|
| ratio | than measured directly, its accuracy is lessened. This value (2.0) was chosen so as to be more lenient than max char ratio, but still allow for relative comparisons of margin guard bars to characters in a segment. |
| min margin ratio | A nominal margin white space is 7 modules wide. The largest element within a label is 4 modules. Choosing the mid-point as the decision point gives a value of 5.5 modules. The margin ratio is calculated using the bars of the guard band plus 2 times the space. For nominal elements, this would be 4 modules. The threshold point is therefore set at 5.5/4 = 1.375. |
| max margin ratio | This value is used to limit the size of the gap between the supplemental addon segment and the standard UPC/EAN segment that it attaches to. Addon data is fairly easily made from scan data that is not part of the label. The upper limit of the gap size helps prevent use of data that is not part of the label from making anm invalid addon. The sum of the widths of the guard band of an addon segment is 5 modules (the space is added twice). Using a max margin ratio of 3.0 allows for gaps of up to 15 modules. Since nominal gap size is 7 modules, this gives ample room for deviation in a valid label. |
| max like element ratio | This value is used verify that two 1 module like elements are the same. Next biggest element is 2 modules, therefore the midpoint (1.5) is chosen to be the best decision point for this test. |
| max addon guard bar ratio, min addon guard bar ratio | The basis for these numbers is similar to above, with the exception that the guard bar ratio is nominally 2 (the second bar is 2 modules wide nominally). Values of 1.5 and 2.5 are midpoints in the decision space between ratio values of 1, 2 and 3. |

9.2.4 General Decoding Method

9.2.4.1 Character Decoding

The UPC/EAN decoder can use "like-edge" measurements for most of the character recognition functions. That is to say, measurements are made from the leading (trailing) edge of a bar to the leading (trailing) edge of the next bar. The decoder sums the widths of the individual elements in a bar-space pair to determine the appropriate like-edge measurement, called a 2-term sum. For a UPC character, two 2-term sums are calculated, $T_1$ and $T_2$. These are defined as the sums of the first bar, first space and first space, second bar respectively. The definitions and subsequent ones assume that the first element of the character being decoded is a bar. If the first element is a space, the order of the 4 elements of the character should be reversed. The sums $T_1$ and $T_2$ generate values ranging from 2 to 5 modules. This provides the capability to distinguish between 16 possible combinations of the sums. (See FIG. 9.1). 12 of the 16 combinations result in unique UPC/EAN character determination. The remaining 4 indicate ambiguous character pairs (even and odd parity 1,7 and 2,8). The two term sums do not give sufficient information to uniquely identify these characters, so more measurements are needed. The nature of these measurements are discussed later in this section. Note that the last space of the character is not used for generation of 2-term sums. This is because the error tolerance on the ending space of the character is significantly larger than the other elements of the character. To determine the size in modules of each 2-term sum, it is normalized by first dividing it by the total character width (T). Since the total width is defined to be 7 modules, module size of each of the sums is in terms of 1/7th's of the total width. Given these calculations, the following decision rules can be established with respect to the interpretation of $T_i$:

$$\frac{T_i}{T} \leq \frac{X_1}{7} \rightarrow T_i \text{ is 2 modules}$$

$$\frac{X_1}{7} < \frac{T_i}{T} \leq \frac{X_2}{7} \rightarrow T_i \text{ is 3 modules}$$

$$\frac{X_1}{7} < \frac{T_i}{T} \leq \frac{X_3}{7} \rightarrow T_i \text{ is 4 modules}$$

$$\frac{X_3}{7} < \frac{T_i}{T} \rightarrow T_i \text{ is 5 modules}$$

where $X_i$ is the appropriate decision threshold in terms of modules.

Choosing values for $X_i$ that are at the midpoint in the decision space yields the following:

$$X_1 = 2.5 \rightarrow \frac{X_1}{7} = 0.3571 = \text{Threshold 1}$$

$$X_2 = 3.5 \rightarrow \frac{X_2}{7} = 0.5 = \text{Threshold 2}$$

$$X_3 = 4.5 \rightarrow \frac{X_3}{7} = 0.6429 = \text{Threshold 3}$$

As mentioned earlier, more information is required to determine the correct character of an ambiguous pair for 4 combinations of $T_1$ and $T_2$. $T_1$ and $T_2$ provide enough information to determine parity, and the specific ambiguous character pair (1,7 or 2,8). Resolving the ambiguity can be accomplished by utilizing the first space and second bar of the character (the second and third elements of the character, respectively) or the first bar and first space (first and second elements). Calculating the ratio of the third element to the second element ($I_3/I_2$) and the first element to the second element ($I_1/I_2$) yields the following:

| Character | $I_3/I_2$ | $I_1/I_2$ |
|---|---|---|
| EVEN 1 | 1 | 1 |
| EVEN 7 | 1/3 | 1/3 |
| ODD 1 | 1 | 1/2 |
| ODD 7 | 3 | 2 |
| EVEN 2 | 2 | 2 |
| EVEN 8 | 1/2 | 1/2 |
| ODD 2 | 1/2 | 3 |
| ODD 8 | 2 | 1 |

Note that, with the exception of EVEN 1 7, resolution of every ambiguous pair requires only a determination of which element is larger. Even 1 7 requires a scale factor before comparison. A midpoint selection yields a factor of ⅔. Thus the decision rules for resolving character ambiguity are:

EVEN 1 7 : $I_2 * X_4 > I_1$ → EVEN 7 else EVEN 1
ODD 1 7 : $I_2 > I_1$ → ODD 1 else ODD 7
EVEN 2 8 : $I_3 > I_2$ → EVEN 2 else EVEN 8
ODD 2 8 : $I_3 > I_2$ → ODD 8 else ODD 2

Where $X_4 = ⅔ = 0.6667$

9.2.4.2 Segment Decoding

Proper framing requires that a segment be decoded from the margin to the center band or, if the decoder has just previously recognized a segment ending on the center band, from the center band to the margin. In cases where the scanner has passed through part of a segment, the center band, and the entire adjoining segment, the decoding will be performed in a backward direction, from the margin just encountered back to the center band. As the character recognition method described above will always return a "valid" character, some other means of rejecting data that is not truly valid must be utilized. The primary method utilized is measurement of relative widths between characters of the segment. Secondary checks of valid parity patterns are done if the character width check passes.

9.2.4.3 Label Decoding

As previously discussed, the segments of a UPC-/EAN label can be scanned in random order. The only exception is supplemental addon data, which must be decoded in conjunction with a valid UPC-A or EAN-8 right half or UPC-E segment. Labels are reconstructed from the decoded segments by utilizing the parity pattern of the encoded characters in each segment. FIGS. 9.2 and 9.3 identify the valid parity patterns for label segments, and the allowed combinations of segments making up the various labels. Many labels contain some of the same segments. The decoder should attempt to assemble labels in order of diminishing complexity, to minimize segment substitution errors. For example, the decoder should start by attempting a UPC D-5 label first since it contains the most segments. If unsuccessful, a D-4 should be tried, and so on.

FIG. 9.2 Segment Parity Patterns

| NOTATION | USED IN | PARITY PATTERN* |
|---|---|---|
| N(1) | EAN-13 | OOEOEE |
| N(2) | " | OOEEOE |
| N(3) | " | OOEEEO |
| N(4) | " | OEOOEE |
| N(5) | " | OEEOOE |
| N(6) | " | OEEEOO |
| N(7) | " | OEOEOE |
| N(8) | " | OEOEEO |
| N(9) | " | OEEOEO |
| E(0) | UPC-E | EEEOOO |
| E(1) | " | EEOEOO |
| E(2) | " | EEOOEO |
| E(3) | " | EEOOOE |
| E(4) | " | EOEEOO |
| E(5) | " | EOOEEO |
| E(6) | " | EOOOEE |
| E(7) | " | EOEOEO |
| E(8) | " | EOEOOE |
| E(9) | " | EOOEOE |
| A(L) | UPC-A | OOOOOO |
| A(R) | UPC-A, EAN-13, VERS-D | EEEEEE |
| D | VERS-D | OOOEEE |
| n(1) | " | EEOO |
| n(2) | " | OEEO |
| n(3) | " | EOOE |
| n(4) | " | EOEO |
| n(5) | " | OEOE |
| n(6) | " | OOEE |
| 8(L) | EAN-8, VERS-D | OOOO |
| 8(R) | " | EEEE |

FIG. 9-3 Valid Label Structures

| Version | | | Characters Total | Data |
|---|---|---|---|---|
| 'l' E  UPC-E  [E(x) 3O, 3E] | | | 7 | 5 |
| 'l' A  UPC-A  [A(L) OO OO OO \| A(R) EE EE EE] | | | 12 | 10 |
| EAN-13  EAN-13  [N(x) 3O, 3E \| A(R) EE EE EE] | | | 13 | 10 |
| EAN-8  EAN-8  [8(L) OO OO \| 8(R) EE EE] | | | 8 | 5 |
| D-1  BLK-1  [D OO OE EE \| h(6) OO EE \| 8(L) OO OO] | | | 14 | 11 |

-continued
FIG. 9-3 Valid Label Structures

| Version | | | | | | | Characters Total | Data |
|---|---|---|---|---|---|---|---|---|
| D-2 | BLK-2 <br> D / OO OE EE \| A(R) / EE EE EE | BLK-3 <br> n(2) / OE EO \| 8(R) / EE EE | | | | | 20 | 16 |
| D-3 | BLK-2 <br> D / OO OE EE \| A(R) / EE EE EE | BLK-6 <br> n(3) / EO OE \| n(5) / OE OE \| 8(R) / EE EE | | | | | 24 | 20 |
| D-4 | BLK-2 <br> D / OO OE EE \| A(R) / EE EE EE | BLK-4 <br> n(5) / OE OE \| n(1) / OO EE | BLK-5 <br> n(4) / EO EO \| 8(R) / EE EE | | | | 28 | 23 |
| D-5 | BLK-2 <br> D / OO OE EE \| A(R) / EE EE EE | BLK-5 <br> n(4) / EO EO \| 8(R) / EE EE | BLK-7 <br> n(3) / EO OE \| n(6) / OO EE \| n(1) / OO EE | | | | 32 | 27 |

9.3 UPC/EAN Decode Algorithm

The specific decoding algorithm is given below. Before entering the UPC algorithm the first time the segment store array should be cleared and last decode point set to first buffer element. The pointer i should be set to a large white space. When decoding in the forward direction, failure of any test results in an exit from the algorithm with continue decode variable set to false. When decoding in the reverse direction, failure of any test should set continue decode false, set the variable last decode point and the current element pointer (i) to the current margin (to prevent another search backward), and re-start the algorithm.

9.3.1 If scanning continuously and no segments have been found for a while, or if the trigger was just pulled, clear the segment buffer. This should be managed in a way that prevents combining segments from different items and depends on characteristics of the scan head used.

9.3.2 Look for a margin backward: If the difference between i and the last decode point is equal to or greater than a minimum segment size (4 char segment=26 elements) then do step 9.3.10 to check for a margin in the reverse direction. If a margin has been found then:
set last char width to margin scaler*(element(i−1)+2*element(i−2)+element(i−3)).
set continue decode to true.
set current margin to i.
set i to i-(2*frame width−1) (to point to first element of next character to decode).
set fwd decode false.
reset the parity bits and segment string to empty.

9.3.3 If continue decode is false (didn't find a margin backward), then look for a margin forward: if there are less than frame width elements available to be examined forward, wait (not enough elements to find margin pattern). If enough, then do step 9.3.10 to check for margin in forward direction. If a margin is found then:
set last char width to margin scaler*(element(i+1)+2*element(i+2)+element(i+3)).
set continue decode to true.
set current margin to i.
set i to i+frame width (to point to first element of next character to decode).
set fwd decode true.
reset the parity bits and segment string to empty.

9.3.4 If continue decode is false then quit (didn't find margin either way).

9.3.5 If continue decode is true and fwd decode is false, do step 9.3.11 to look for a valid segment in the backward direction. If continue decode is true and fwd decode is true, then do step 9.3.16 to look for valid segment in the forward direction.

9.3.6 If segment found, check for addon by doing step 9.3.26.

9.3.7 This step deleted.

9.3.8 Add the previously captured segment string to the segment store array. Set found segment to false, and set segment string to empty.

9.3.9.1 If continue decode is true and fwd decode is true do step 9.3.16. (Try to read the next segment of a label.)

9.3.9.2 Try to make a label by doing step 9.3.38. If make label was successful, then set found label true, set label type.

9.3.9.3 Return.

9.3.10 Margin check algorithm: If fwd decode true, check that element(i)/(element(i+1)+2*element(i+2)+element(i+3))>min margin ratio. If fwd decode false, check that element(i)/(element(i−1)+2*element(i−2)+element(i−3))>min margin ratio. If not ok, then test failed, return. If ok, then if fwd decode true calculate ratio=element(i+1)/element(i+3). If fwd decode false, ratio=element(i−1)/element(i−3). If ratio>max like element ratio or (1/ratio)>max like element ratio then test failed, return. Otherwise, test passed, return.

9.3.11 Get backward segment algorithm: Check if data is available in the backward direction (i>=last decode point+1). If not available, set continue decode false and go to step 9.3.14.

9.3.12 Use steps 9.3.21 thru 9.3.24 to get a possible segment character. If successful:
add character to the segment string.
shift the parity bits map left 1 bit.
add 1 to the map if the character is even parity.
set last char width to the current char width
subtract frame width from i
Otherwise, go to step 9.3.14.

9.3.13 If length of segment string greater than 6 then set continue decode false and go to step 9.3.15 (too many characters in the segment string). Otherwise, go back to step 9.3.11.

9.3.14 If length of segment string is not 4 or 6 then goto step 9.3.15. Otherwise, if element(i) is not a bar then go to step 9.3.15 (framing problem). Otherwise, if char width was not too small then go to step 9.3.15 (isn't a center-band). Otherwise, if the decoded character is not an ambiguous character (1,2,7 or 8) then go to step 9.3.15 (not a center-band). Otherwise, set last char width to current width, decrement i by 1 and use steps 9.3.21 thru 9.3.24 to get another character. If not successful or the decoded character is not an ambiguous character then go to step 9.3.15. Otherwise, use step 9.3.25 to decode segment parity map with reverse set false. If segment type is ok, then set segment found true and check if segment type is UPC-A right half or EAN-8 right half or UPC D n1, reverse segment string digits if segment is one of those types. (scanned it backward)

9.3.15 Set last decode point to the current margin. Set continue decode to false and set i back to current margin. Return to main section of the algorithm.

9.3.16 Get forward segment algorithm: Check if data is available in the forward direction (i<=last buffer element+frame width). If not available, wait.

9.3.17 Use steps 9.3.21 thru 9.3.24 to get a possible segment character. If successful:
add character to the segment string.
shift the parity bits map left 1 bit.
add 1 to the map if the character is even parity.
set last char width to the current char width
add frame width to i
Otherwise, go to step 9.3.19.

9.3.18 If length of segment string is less than 6 then go to step 9.3.16. Otherwise set continue decode to false and return.

9.3.19 Set continue decode to false. If length of segment string is not 4 or 6 then return. Otherwise, if element(i) is a bar then go to step 9.3.20. Otherwise, if char width was not too small then return (isn't a center-band). Otherwise, if the decoded character is not an ambiguous character (1,2,7, or 8) then return (not a center-band). Otherwise, set last char width to current width, increment i by 1 and use steps 9.3.21 thru 9.3.24 to get another character. If not successful or the decoded character is not an ambiguous character then return. Otherwise, use step 9.3.25 to decode segment parity map (with reverse flag false). If segment type not ok return, otherwise set found segment true and check if segment type is UPC-A right half or EAN-8 right half or UPC D n1, reverse segment string digits if segment is one of those types. (scanned it backward). Then set continue decode true (to try decoding from the center band out), set i to i+frame width, and return.

9.3.20 Segment ended on margin: If character is not too big then return (not a margin char). Increment i by 3, set fwd decode false, and do step 9.3.10 to check margin. Set fwd decode true. If margin not OK return, otherwise use step 9.3.26 to decode segment parity map (with reverse flag true). If segment type not ok return, otherwise set found segment true and check if segment is not type UPC-A right half or EAN-8 right half or UPC D n1, if it isn't, then reverse segment string (scanned a left half backward). Do step 9.3.8. Set last decode point to i, set current margin to i. Look for an addon by doing step 9.3.26. Go to 9.3.3 to try finding additional label segments.

9.3.21 Get character: Sum elements from i to i+3 to get char width. If element(i) is a bar, then set 2-term sum 1 to element(i)+element(i+1), 2-term sum 2 to element(i+1)+element(i+2). Otherwise, set 2-term sum 1 to element(i+2)+element(i+3), 2-term sum 2 to element(i+1)+element(i+2). Set ratio 1 to 2-term sum 1/char width, ratio 2 to 2-term sum 2/char width. If ratio 1<threshold 1 then set weight to 0, otherwise if ratio 1<threshold 2 then set weight to 4, otherwise if ratio 1<threshold 3 then set weight to 8, otherwise set weight to 12. If ratio 2<threshold 1 then do nothing, otherwise if ratio 2<threshold 2 then set weight to weight+1, otherwise if ratio 2<threshold 3 then set weight to weight+2, otherwise set weight to weight+3.

9.3.22 Use the value weight to index into the following table of characters:

| | |
|---|---|
| 0: character = 6, even=true; | 8: character = 9, even=true; |
| 1: character = 0, even=false; | 9: character = 2, even=false; |
| 2: character = 4, even=true; | 10: character = 1, even=true; |
| 3: character = 3, even=false; | 11: character = 5, even=false; |
| 4: character = 9, even=false; | 12: character = 6, even=false; |
| 5: character = 2, even=true; | 13: character = 0, even=true; |
| 6: character = 1, even=false; | 14: character = 4, even=false; |
| 7: character = 5, even=true; | 15: character = 3, even=true; |

For example, if weight=4, then the decoded character=9 and even parity is set false.

9.3.23 Check ambiguities:
If character=2 and element(i) is a space and even is true, and element(i+2)>element(i+1) then set character to 8.
If character=2 and element(i) is a bar and even is true, and element(i+2)<element(i+1) then set character to 8.
If character=2 and element(i) is a space and even is false, and element(i+2)<element(i+1) then set character to 8.
If character=2 and element(i) is a bar and even is false, and element(i+2)>element(i+1) then set character to 8.
If character=1 element(i) is a space and even is false, and element(i+3)>element(i+2) then set character to 7.
If character=1 and element(i) is a bar and even is false, and element(i)>element(i+1) then set character to 7.
If character=1 and element(i) is a space and even is true, and element(i+2)*ambiguity scale>element(i+3) then set character to 7.
If character=1 and element(i) is a bar and even is true, and element(i+1)*ambiguity scale>element(i) then set character to 7.

9.3.24 Check widths: If char width/last char width>max char ratio then return with char too big indication. If char width/last char width<(1/min char ratio) then return with char too small indication. Otherwise, return with successful indication.

9.3.25 Segment parity decode: If reverse is true, then reverse order of parity bits. If the length of the segment string is 6, then set segment type and encoded digit from the following look up table:

| | | | |
|---|---|---|---|
| S00 | (OOOOOO), | segment type = UPC A L, | encoded digit = 0 |
| S07 | (OOOEEE), | segment type = UPC D, | encoded digit = 0 |

-continued

| | | | |
|---|---|---|---|
| $0B | (OOEOEE), | segment type = EAN13 L, | encoded digit = 1 |
| $0D | (OOEEOE), | segment type = EAN13 L, | encoded digit = 2 |
| $0E | (OOEEEO), | segment type = EAN13 L, | encoded digit = 3 |
| $13 | (OEOOEE), | segment type = EAN13 L, | encoded digit = 4 |
| $15 | (OEOEOE), | segment type = EAN13 L, | encoded digit = 7 |
| $16 | (OEOEEO), | segment type = EAN13 L, | encoded digit = 8 |
| $19 | (OEEOOE), | segment type = EAN13 L, | encoded digit = 5 |
| $1A | (OEEOEO), | segment type = EAN13 L, | encoded digit = 9 |
| $1C | (OEEEOO), | segment type = EAN13 L, | encoded digit = 6 |
| $23 | (EOOOEE), | segment type = UPC E, | encoded digit = 6 |
| $25 | (EOOEOE), | segment type = UPC E, | encoded digit = 9 |
| $26 | (EOOEEO), | segment type = UPC E, | encoded digit = 5 |
| $29 | (EOEOOE), | segment type = UPC E, | encoded digit = 8 |
| $2A | (EOEOEO), | segment type = UPC E, | encoded digit = 7 |
| $2C | (EOEEOO), | segment type = UPC E, | encoded digit = 4 |
| $31 | (EEOOOE), | segment type = UPC E, | encoded digit = 3 |
| $32 | (EEOOEO), | segment type = UPC E, | encoded digit = 2 |
| $34 | (EEOEOO), | segment type = UPC E, | encoded digit = 1 |
| $38 | (EEEOOO), | segment type = UPC E, | encoded digit = 0 |
| $3F | (EEEEEE), | segment type = UPC A R, | encoded digit = 0 |

For example, a parity bits map of 2A hex would set segment type to UPC E and encoded digit to 7. If segment type=UPC E then add encoded digit to end of segment string. If segment type=EAN 13 L then add encoded digit to start of segment string.

If length of segment string=4 then set segment type and encoded digit from the following table:

| | | | |
|---|---|---|---|
| $00 | (OOOO), | segment type = EAN8 L, | encoded digit = 0 |
| $03 | (OOEE), | segment type = UPC D n6, | encoded digit = 6 |
| $05 | (OEOE), | segment type = UPC D n5, | encoded digit = 5 |
| $06 | (OEEO), | segment type = UPC D n2, | encoded digit = 2 |
| $09 | (EOOE), | segment type = UPC D n3, | encoded digit = 3 |
| $0A | (EOEO), | segment type = UPC D n4, | encoded digit = 4 |
| $0C | (EEOO), | segment type = UPC D n1, | encoded digit = 1 |
| $0F | (EEEE), | segment type = EAN8 R, | encoded digit = 0 |

If the parity bits map is not contained in the table, set error indication and return.

9.3.26 Check for supplemental addon segment:

Set continue decode addon to false. If found addon has not been set true, then check current segment found. If current segment type is UPC E and both forward decode and reverse are false (segment was decoded backwards from margin to center band), then set is to the current margin−34 (width of an E-segment), fwd decode addon to false, and continue decode addon to true.

If current segment type is UPC E and fwd decode is true and reverse is false (segment was decoded foward from margin to center-band), then set is to the current margin+34 (width of an E-segment), fwd decode addon to true, and continue decode addon to true.

If current segment is UPC A Right or EAN 8 right, and both fwd decode and reverse are true (forward direction decode from center-band to margin), then set is to the i, set fwd decode addon true, and set continue decode addon true.

If current segment is UPC A Right or EAN 8 Right, and fwd decode is true but reverse is false (forward direction decode from margin to center-band), then set is to current margin, fwd decode addon to false, and continue decode addon true.

If current segment is UPC A Right or EAN 8 Right, and both fwd decode and reverse are false (backward decode from center-band to margin), then set is to current margin, fwd decode addon to true and continue decode addon to true.

9.3.27 If continue decode addon is true (found a segment with a possible addon) then clear addon parity bits, addon string. If continue decode addon is true and fwd decode addon is true then set addon data available to true. If less than a frame width worth of elements are in the data buffer, wait (ai greater than last buffer location−frame width). If continue decode addon is true and fwd decode addon is false then set addon data available to true if ai is greater than or equal to 13+first buffer element (at least enough to make 2 char addon), otherwise set it false. If addon data available is set false, then set continue decode addon to false and return (not enough data backward to make addon segment). Otherwise, if fwd decode addon is false go to 9.3.31.

9.3.28 Decode addon in forward direction: If addon string empty, then wait until at least 2*frame width counts are available in the buffer (ai< =last element−2*frame width) else (if addon string not empty) then wait until at least frame width counts are available in the buffer (ai< =last element−(frame width+1).

9.3.29 Do all of this section if addon string empty. Check that element(ai)/(element(ai+1)+element-(ai+2)+element(ai+3)) is greater than min margin ratio and less than max margin ratio. If ok, then check that element(ai+3)/element(ai+2) is greater than min addon guard bar ratio and less max addon guard bar ratio. If ok, then check that element(ai+2-)/element(ai+1) is less than max like element ratio and greater than (1/max like element ratio). If ok, then set addon last char width to (element(ai+1)+-2*element(ai+3))*9/5, set ai to ai+frame width. If any test not ok, set continue decode addon false.

9.3.30 If addon data available is true and continue decde addon is true, then do steps 9.3.21 to 9.3.23 to get character (don't check widths), else return. If addon string is empty then add element(ai-3)+element(ai-2) to char width, else add element(ai-2)+element(ai-1) to char width. If char width/addon last char width->max char ratio or <(1/max char ratio) then set continue decode addon to false, else append decoded character to addon string, set ai to ai+frame width+2, set last char width to char width, append parity bit (even=1) to addon parity bits, set continue decode addon false if addon string has 5 elements (maximum). Go to step 9.3.35

9.3.31 Decode addon in backward direction: If addon string empty, then set addon data available to true if enough data to make guard bar plus first char (ai>=-first buffer element+2*frame width) else (if addon string not empty) then set addon data available to true if at least frame width counts in buffer (ai>=first buffer element+frame width).

9.3.32 Do all of this section if addon data available is true and addon string empty. Check that element-(ai)/(element(ai-1)+elements(ai-2)+element(si-3)) is greater than min margin ratio and less than max margin ratio. If ok, then check that element(ai-3)/element(ai-2) is greater than min addon guard bar ratio and less than max addon guard bar ratio. If ok, then check that elemental(ai-2)/element(ai-1) is less than max like element ratio and greater than (1/max like element ratio). If ok, then set addon char width to (element(ai-1)+2*element(ai-2)+element(ai-3))*9/5, set at to ai minus (2*frame width−1). If any test not ok, set continue decode addon false.

9.3.33 If addon data available is true and continue decode addon is true, then do steps 9.3.21 to 9.3.23 to get character (don't check widths), else go to step 9.3.35. If addon string is empty then add element-(ai+5)+element(ai+6) to char width, else add element(ai+5)+element(ai+4) to char width. If char width/addon last char width>max char ratio or <(1/max char ratio) then set continue decode addon to false, else append decoded character to addon string, set ai to ai-frame width-2, set last char width to char width, append parity bit (even=1) to addon parity bits, set continue decode addon false if addon string has 5 elements (maximum).

9.3.34 If addon data available is false then set continue decode addon to false and return to the main algorithm (not enough backward data available).

9.3.35 If continue decode addon is true than if fwd decode addon is true then go to step 9.3.28. If continue decode addon is true and fwd decode addon is false, then go to step 9.3.31. Otherwise, if length of addon string not equal to 2 or 5 then return (not a valid addon).

9.3.36 If length of addon string is 2, then calculate parity as the mod 4 of the value of the 2-digit addon (eg. if addon string is '13', then parity is 13 mode 4=1). If calculated parity doesn't match parity bits then quit. Otherwise set found addon to true, and addon type to 2-char, and return.

9.3.37 If length of addon string is 5, then calculate parity as (3+sum of digits 1, 3 and 5 of addon strong+9-*sum of digits 2 and 4) mod 10. Index the parity digit into the following table (starting reference of 0):

(S18,S14,S12,S11,S0C,S06,S03,S0A,S09,S05)

If the indexed parity pattern equals addon parity bits then set found addon to true, and addon type to 5-char, then return.

9.3.38 Attempt to assemble label: (There are many possible methods of deciding vality of a label. The one presented here checks for capture of segments needed to make labels as follows: If a UPC-D segment was seen, try UPC-D5 through D1. If no D segment was seen, try UPC-A, then EAN-13, the UPC-E, then EAN-8. Check digits are tested in each block as it is evaluated. The segment capture and label assembly methods used in this algorithm are straightforward. More sophisticated methods may be used. One method would be to keep a count of how many times a particular segment has been seen, and use a rule controlling when it would be replaced by newly scanned data. For example, if a particular UPC-A-R segment was seen one time, then a different one was seen, replace the old one in the segment array with the new one. If the old one had been seen two or more times, keep the old one, and discard the new one. This makes it easy to require seeing certain error prone segments (UPC-E, EAN-8) twice by just requiring a total of two or more. Another method is to keep two complete segment array buffers, each with a set of totals for how many times each segment has been seen. Initially, the buffers and totals are all cleared. Up to two different versions of each segment type are collected, with totals for how many times they have been seen. If a third version of a particular segment type is seen, it is discarded. Then during the process of determining if a good label has been seen, the two counts for each segment type are examined. If one version of the data has been seen much more than another, it is accepted. If two versions of the data have been seen frequently, is is not accepted. For example, if a UPC-D segment 012345 was seen three times, and a UPC-D segment 018345 was seen two times, don't accept either. If the first one was seen four times, and the second one was seen one time, accept the first as being ok.)

9.3.38.1 If segment store array contains UPC-D go to 9.3.38.2, otherwise go to 9.3.38.10.

9.3.38.2 If segment store array contains UPC-A-R then go to 9.3.38.4, otherwise up to 9.3.38.3.

9.3.38.3 If segment store array contains UPC-D-n6, EAN-8-L, and the Block 1 checksum calculation is ok (step 9.3.39)set label type to UPC-D1, set found label true. Return in all cases.

9.3.38.4 If the Block 2 checksum calculation is not ok (step 9.3.39) return. Otherwise go to 9.3.38.5.

9.3.38.5 If segment store array contains UPC-D-n4 and EAN-8-R, do Block 5 checksum calculation (step 9.3.39). If ok go to 9.3.38.6, otherwise go to 9.3.38.8.

9.3.38.6 If segment store array contains UPC-D-n3 and UPC-D-n6 and UPC-D-n1 and the Block 7 checksum calculation is ok (step 9.3.39) set label type to UPC-D5, set found label true, return. Otherwise go to 9.3.38.7.

9.3.38.7 If segment store array contains UPC-D-n5 and UPC-D-n1 and the Block 4 checksum calculation is ok (step 9.3.39), set label type to UPC-D4, set found label true, return. Otherwise go to 9.3.38.8.

9.3.38.8 If segment store array contains UPC-D-n3 and UPC-D-n5 and Ean-8-R and the Block 6 checksum calculation is ok (step 9.3.39), set label type to UPC-D3, set found label true, return. Otherwise go to 9.3.38.9.

9.3.38.9 If segment store array contains UPC-D-n2 and Ean-8-R and the Block 3 checksum calculation is ok (step 9.3.39), set label type to UPC-D2, set found label true. Return in all cases.

9.3.38.10 If segment store array contains UPC-A-R, go to 9.3.38.11. Otherwise go to 9.3.38.13.

9.3.38.11 If segment store array contains UPC-A-L, and the UPC-A checksum calculation is ok (step 9.3.39), set found label true, set label type to UPC-A, return. Otherwise go to 9.3.38.12.

9.3.38.12 If segment store array contains EAN-13-L and the EAN-13 checksum calculation is ok (step 9.3.39), set label type to EAN-13, set found label true. Return in all cases.

9.3.38.13 If segment store array contains UPC-A-L, return. Otherwise, go to 9.3.38.14.

9.3.38.14 If segment store array contains UPC-E, and the UPC-E checksum calculation is ok (step 9.3.39), set label type to UPC-E, set found label true, return. If no UPC-E was in the buffer, go to 9.3.38.15, otherwise return.

9.3.38.15 If segment store array contains EAN-8-L and EAN-8-R, and the EAN-8 checksum calculation is ok (step 9.3.39), set label type to EAN-8, set found label true. Return in all cases.

9.3.39 Checksum calculation: Calculate the check sum of a block using the UPC specification rules. See FIG. 9.3 for a definition of the various blocks. If any checksums are not zero, then the test failed.

The checksum for each block is calculated by starting from the rightmost character of a block, adding the numeric value of the characters multiplied by a weighting factor. The weighting factor is alternately 3 and 1. If the mod 10 sum of the weighted characters is 0, the checksum is correct. Example: For a Block 6 (found in a UPC D-3) with characters 123456789104, the sum is 3×4+1×0+3×1+1×9+3×8+1×7+3×6+1×5-+3×4+1×3+3×2+1×1=100. 100 mod 10=0, so it is ok.

A program listing for the above algorithms in assembly language for implementation on a Thompson-Mostek MK68HC200 microprocessor is retained in the patent file.

Having described the invention in detail and by reference to the preferred embodiment thereof, it will be apparent that other modifications and variations are possible without departing from the scope of the invention defined in the appended claims.

What is claimed is:

1. A method of decoding a binary scan signal consisting of a bit sequence produced by an electro-optical scanning device as the device scans bar code symbols on a label, the bits in said sequence corresponding to light and dark spaces making up said bar code symbols, comprising the steps of:
   a. supplying said binary scan signal to a storage buffer such that said buffer contains a plurality of bits most recently produced by said scanning device,
   b. selecting a portion of said bit sequence which defines a large light space,
   c. subjecting the bits in the sequence following those defining said large light space to a series of tests to determine whether such bits were produced by scanning a bar code symbol which is valid in one or more of several bar codes,
   d. decoding tyhe bar code symbol in the codes in which it is valid,
   e. subjecting the next bits to the sequence to a series of tests to determine whether such bits were produced by scanning a bar code symbol which is valid in any of the bar codes in which the previously decoded bar code symbol is valid,
   f. decoding the bar code symbol in the codes in which it and the previously decoded bar code symbol are valid, and
   g. repeating steps e.) and f.) above until all bar code symbols on the label have been decoded.

2. The method of claim 1 in which said several bar codes include one or more codes selected from the group consisting of Code 3 of 9. Interleaved 2 of 5, Codabar, Code 93, Code 128, and UPC/EAN.

3. The method of claim 1 in which one of said series of tests is the comparison of the element ratio of the bits being tested with preset minimum and maximum element ratio levels, said element ratio being the ratio of the width of the widest of the dark spaces making up the symbol to the width of the narrowest of the dark spaces making up the symbol.

4. The method of claim 1 in which one of said series of tests is the comparison of the element ratio of the bits being tested with preset minimum and maximum element ratio levels, said element ratio being the ratio of the width of the widest of the light spaces making up the symbol to the width of the narrowest of the light spaces making up the symbol.

5. The method of claim 1 in which one of the series of tests is the comparison of the margin ratio of the bits being tested with a preset minimum margin ratio level, said margin ratio being the ratio of the width of the large light space preceding the symbols on a label to the sum of the width of the first several light and dark spaces making up the first symbol adjacent the large light space.

6. The method of claim 1 in which one of the series of tests is the comparison of the threshold ratio of the bits being tested with a preset with a threshold ratio, said threshold ratio being the ratio of the width of the widest light or dark space making up the symbol to the width of a particular light or dark space within the symbol.

7. The method of claim 1 in which one of the series of tests is the comparison of the character ratio of the bits being tested with preset maximum and minimum character ratio levels, said character ratio being the ratio of the sum of the widths of the light and dark spaces making up a symbol to the sum of the widths of the light and dark spaces making up the previous symbol.

8. The method of claim 1 in which one of the series of tests is the comparison of the gap ratio of the bits being tested with preset maximum and minimum gap ratio levels, said gap ratio being the sum of the widths of the light and dark spaces making up a symbol to the width of the light space between the symbol and an adjacent symbol.

9. The method of claim 1 in which one of the series of tests is the comparison of the maximum narrow element ratio of the bits being tested with a preset maximum narrow element ratio level, said maximum narrow element ratio being the greater of the maximum ratio of the width of the narrowest dark space in a symbol to the width of the narrowest light space in the symbol, or the maximum ratio of the width of the narrowest light space in the symbol to the width of the narrowest dark space in the symbol.

10. The method of claim 1 in which step d. includes the step of checking to determine whether the decoded bar code symbol is a backward or forward start or end symbol prior to subjecting further bits in the sequence to testing and decoding.

11. The method of claim 1 in which step g. includes the step of checking the decoded bar code symbol to insure that it is decoded as a symbol which is one of a valid set of such symbols prior to repeating steps e. and f.

12. The method of claim 1 in further comprising the step of comparison of the margin ratio of the bits in the sequence defining the final symbol with a preset minimum margin ratio level, said margin ratio being the ratio of the width of a large light space following the symbols on a label to the sum of the width of the last several light and dark spaces making up the last symbol adjacent the large light space.

13. The method of claim 1 in which at least some of the tests to determine whether the bits in the bit sequence were produced by scanning a bar code symbol which is valid in several codes are performed simultaneously.

14. The method of claim 1 in which the tests to determine whether the bits in the bit sequence were produced by scanning a bar code symbol which is valid in several codes are performed sequentially.

15. The method of claim 1 in which steps b. through g. are performed by a programmed digital computer.

16. The method of claim 1 in which one of said series of tests is the comparison of a threshold ratio of the bits being tested with several preset ratios, said threshold ratio being the ratio of the width of two of the spaces making up the symbol to the total width of the symbol.

17. A method of decoding a digital scan signal consisting of a bit sequence produced by an electro-optical scanning device as the device scans bar code symbols on a label, comprising the steps of:
  a. storing the bits of the digital scan signal which have been most recently produced by the electro-optical scanning device;
  b. selecting a portion of said bits which defines a large white space;
  c. subjecting a number of the bits in the sequence following those defining said large light space to a series of tests to determine whether such bits were produced by scanning one or more bar code symbols which are valid in one or more of several bar codes; and
  d. decoding the bits determiined to have been produced by scanning one or more bar code symbols which are valid in one or more of said several bar codes.

18. The method of claim 17 for decoding a digital scan signal, further comprising the step of:
  e. performing a series of additional tests on the bits in the decoded sequence to validate that such bits were produced by scanning one or more bar code symbols which are valid in one or more of said several bar codes.

19. The method of claim 17 in which said several bar codes include one or more codes selected from the group consisting of Code 3 of 9, Interleaved 2 of 5, Codabar, Code 93, Code 128, and UPC/EAN.

20. The method of claim 17 in which said steps a. through d. are performed by programmed digital computer.

* * * * *

UNITED STATES PATENT AND TRADEMARK OFFICE
CERTIFICATE OF CORRECTION

PATENT NO. : 4,879,456

DATED : November 7, 1989

INVENTOR(S) : Craig D. Cherry, Andrew P. Taussig, Michael T. Brooks

It is certified that error appears in the above-identified patent and that said Letters Patent is hereby corrected as shown below:

```
Col. 1,  line 34,  "test" should be --text--.
Col. 2,  line 37,  "present" should be --preset--.
Col. 2,  line 57,  "present" should be --preset--.
Col. 7,  line 61,  "met" should be --set--.
Col. 11, line 9,   "ZRQ...." should be --ZKR....--.
Col. 16, line 1,   "i+B1)>" should be --i+1)<--.
Col. 16, line 49,  "of" should be --or--.
Col. 16, line 55,  "win" should be --min--.
Col. 18, line 44,  "to" should be --into--.
Col. 19, line not numbered: second to last line,
         "in" should be --is--.
Col. 22, line 26,  "caling" should be --calling--.
Col. 27, line 14,  "characeter" should be --character--.
Col. 27, line 23,  "the" should be --any--.
Col. 31, line 30,  "ceiling" should be --calling--.
Col. 34, line 45,  "si" should be --is--.
Col. 35, line 11,  "(i+5)/" should be --(i+5))/--.
Col. 50, line 56,  "decde" should be --decode--.
Col. 51, line 10,  "elements" should be --element--.
Col. 51, line 10,  "(si-3))" should be --(ai-3))--.
Col. 51, line 15,  "elemental" should be --element--.
Col. 51, line 17,  "addon char" should be --addon last char--.
Col. 51, line 49,  "(3+sum" should be --(3 * sum)--.
Col. 51, line 59,  "vality" should be --validity--.
Col. 51, line 63,  "the" should be --then--.
Col. 53, line 28,  "language for implementation" should be
         --language is given below for implementation--.
Col. 53, line 29,  "microprocessor is retained in the
         patent file" should be --microprocessor.--.
```

UNITED STATES PATENT AND TRADEMARK OFFICE
CERTIFICATE OF CORRECTION

PATENT NO. : 4,879,456
DATED : November 7, 1989
INVENTOR(S) : Craig D. Cherry, Andrew P. Taussig, Michael T. Brooks It is certified that error appears in the above-identified patent and that said Letters Patent is hereby corrected as shown below:

Col. 53, line 53, "tyhe" should be --the--.
Col. 53, line 55, "to the" should be --in the--.
Col. 56, line 9, "bits determiined" should be --bits determined--.

Signed and Sealed this

Fourth Day of June, 1991

Attest:

HARRY F. MANBECK, JR.

Attesting Officer

Commissioner of Patents and Trademarks